(12) United States Patent
Agarwal et al.

(10) Patent No.: US 11,216,430 B2
(45) Date of Patent: *Jan. 4, 2022

(54) NEXT GENERATION NEAR REAL-TIME INDEXING

(71) Applicant: eBay Inc., San Jose, CA (US)

(72) Inventors: Swati Agarwal, Sunnyvale, CA (US);
Amit Basu, San Jose, CA (US);
Thomas Pan, Mountain View, CA (US); Pradeep Sankaranthi, Fremont, CA (US); Nicholas Whyte, San Jose, CA (US)

(73) Assignee: eBay Inc., San Jose, CA (US)

( * ) Notice: Subject to any disclaimer, the term of this patent is extended or adjusted under 35 U.S.C. 154(b) by 193 days.

This patent is subject to a terminal disclaimer.

(21) Appl. No.: 15/787,283

(22) Filed: Oct. 18, 2017

(65) Prior Publication Data
US 2018/0101554 A1   Apr. 12, 2018

Related U.S. Application Data

(63) Continuation of application No. 14/145,414, filed on Dec. 31, 2013, now Pat. No. 9,805,078.

(60) Provisional application No. 61/747,677, filed on Dec. 31, 2012.

(51) Int. Cl.
*G06F 16/22* (2019.01)
(52) U.S. Cl.
CPC ................. *G06F 16/2228* (2019.01)
(58) Field of Classification Search
CPC .. G06F 16/2228; G06F 16/2272; G06F 16/41; G06F 16/951; G06F 16/182; G06F 16/2471; G06F 16/90335; G06F 16/2455; G06F 16/2465; G06F 16/2365; G06F 16/24578; G06F 16/22; G06F 16/27; G06F 16/901; G06F 17/30321
See application file for complete search history.

(56) References Cited

U.S. PATENT DOCUMENTS

| 8,489,604 B1* | 7/2013 | Sadovsky | G06F 16/951 |
| | | | 707/737 |
| 8,661,023 B1* | 2/2014 | Chun | G06F 16/9027 |
| | | | 707/718 |
| 9,805,078 B2 | 10/2017 | Agarwal et al. | |
| 2005/0223027 A1* | 10/2005 | Lawrence | G06F 16/90 |
| | | | 707/999.103 |
| 2005/0234848 A1 | 10/2005 | Lawrence et al. | |

(Continued)

OTHER PUBLICATIONS

U.S. Appl. No. 14/145,414, Final Office Action dated Apr. 10, 2017, 9 pages.

(Continued)

*Primary Examiner* — Yuk Ting Choi
(74) *Attorney, Agent, or Firm* — Holland & Hart LLP

(57) ABSTRACT

Methods and systems to build and utilize a search infrastructure are described. The system generates, by a first indexing subsystem, full indexes of data and sends the full indexes to a plurality of query node servers via a distribution system. The system generates, mini-indexes associated with the full indexes and sends the mini-indexes to the plurality of query node servers. The system causes the plurality of query nodes to update indexing information based on the full indexes and the mini-indexes.

18 Claims, 12 Drawing Sheets

(56) References Cited

U.S. PATENT DOCUMENTS

| | | | |
|---|---|---|---|
| 2006/0041560 A1* | 2/2006 | Forman | G06F 16/951 707/999.01 |
| 2008/0104100 A1* | 5/2008 | Richardson | G06F 16/951 707/999.102 |
| 2008/0301087 A1* | 12/2008 | Bernard | G06F 16/2272 707/999.002 |
| 2010/0205160 A1* | 8/2010 | Kumar | G06F 16/31 707/696 |
| 2011/0270820 A1* | 11/2011 | Agarwal | G06F 17/273 707/709 |
| 2012/0179684 A1 | 7/2012 | Alba et al. | |
| 2013/0080268 A1 | 3/2013 | Gordon et al. | |
| 2013/0232152 A1* | 9/2013 | Dhuse | G06F 3/067 707/741 |
| 2013/0246560 A1 | 9/2013 | Feng et al. | |
| 2014/0032566 A1 | 1/2014 | Agarwal et al. | |
| 2014/0188840 A1 | 7/2014 | Agarwal et al. | |

OTHER PUBLICATIONS

U.S. Appl. No. 14/145,414, Final Office Action dated Jun. 17, 2016, 21 pages.

U.S. Appl. No. 14/145,414, Non Final Office Action dated Oct. 11, 2016, 11 pages.

U.S. Appl. No. 14/145,414, Non Final Office Action dated Dec. 9, 2015, 18 pages.

U.S. Appl. No. 14/145,414, Notice of Allowance dated Jun. 26, 2017, 12 pages.

U.S. Appl. No. 14/145,414, Response filed Feb. 7, 2017 to Non Final Office Action dated Oct. 11, 2016, 14 pages.

U.S. Appl. No. 14/145,414, Response filed May 9, 2016 to Non Final Office Action dated Dec. 9, 2015, 12 pages.

U.S. Appl. No. 14/145,414, Response filed Jun. 1, 2017 to Final Office Action dated Apr. 10, 2017, 12 pages.

U.S. Appl. No. 14/145,414, Response filed Sep. 19, 2016 to Final Office Action dated Jun. 17, 2016, 9 pages.

\* cited by examiner

NEXT GENERATION NEAR REAL-TIME INDEXING

RELATED APPLICATIONS

This application is a continuation of U.S. application Ser. No. 14/145,414, filed Dec. 31, 2013, which claims the benefit of priority to U.S. Provisional Application No. 61/747,677, filed on Dec. 31, 2012, each of which is hereby incorporated by reference in its entirety.

TECHNICAL FIELD

This disclosure relates to the technical field of data storage and retrieval. More particularly, systems and methods to build and utilize a search infrastructure.

RELATED ART

A search infrastructure supports the storage of data items in one or more databases and the retrieval of the data items from the one or more databases. Building and utilizing the search infrastructure may present many technical challenges. In particular the performance, manageability, and quality of service in storing and retrieving the data items may present many opportunities for innovation.

BRIEF DESCRIPTION OF THE DRAWINGS

Embodiments illustrated, by way of example and not limitation, in the figures of the accompanying drawings, in which.

DETAILED DESCRIPTION

In the following description, for purposes of explanation, numerous specific details are set forth in order to provide a thorough understanding of some example embodiments. It will be evident, however, to one of ordinary skill in the art that embodiments of the present disclosure may be practiced without these specific details.

As described further below, according to various example embodiments of the disclosed subject matter described and claimed herein, systems and methods to build and utilize a search infrastructure are provided. Various embodiments are described below in connection with the figures provided herein.

Figure 1:
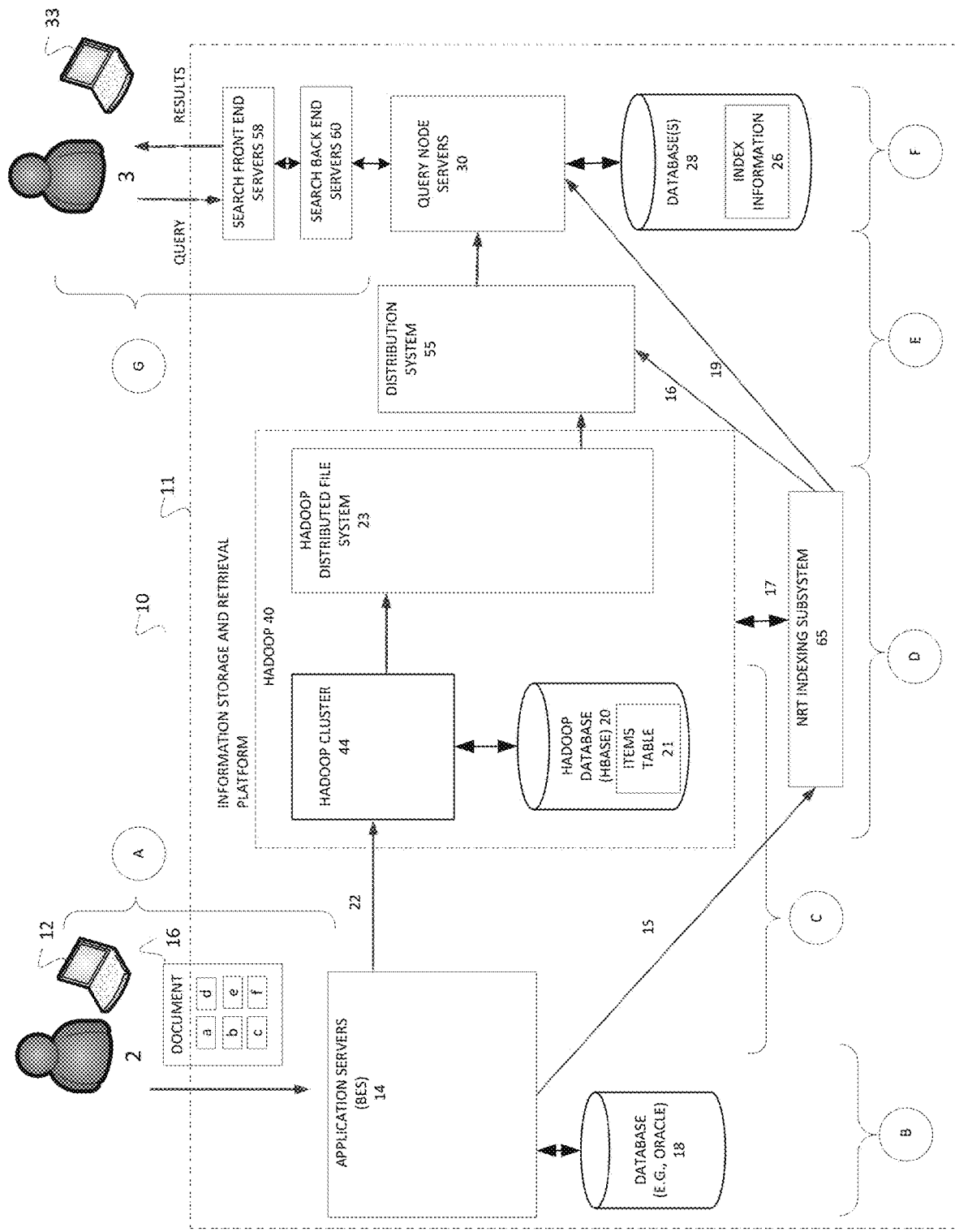
FIG. 1 is a block diagram that illustrates a system, according to an embodiment, to build and utilize a search infrastructure.

FIG. 1 illustrates a system 10 to build and utilize a search infrastructure, according to an embodiment. The system 10 may include an information storage and retrieval platform 11 that is communicatively coupled over a network (e.g., Internet) (not shown) to a client machine 12 and a client machine 33.

Illustrated on the top left is an operation A that describes a first user operating the client machine 12 to interact with application servers 14 to store or update a document 16 in a database 18; illustrated in the middle are operations B, C, D, E and F that describe retrieving and transforming the contents of the database 18, storing the transformed contents in a database 20 (e.g., Hbase) that is time-stamped, retrieving the contents from a database 20 to update index information 26 in a database 28 to be consumed and served by query node servers 30; and illustrated on the top right is an operation G that describes a second user who operates a client machine 33 to enter a query that is received by one or more query node servers 30 that, in turn, apply the query to the index information 26 to identify and return search results that reference the document 16. The above operations to continually rebuild the index information 26 are performed in real-time and without interruption to service that is provided to the first and second users who continue to interact with the system 10.

By providing an near real time (NRT) indexing subsystem 65, external to a Hadoop 40 and therefore not subject to the internal constraints of the Hadoop map-reduced indexing system, the information storage and retrieval platform 11 may quickly pull data updates out of database 18 (as described by operation B) and distribute the data updates to the searchable portion of platform 11 (as described by operation F). The NRT indexing subsystem 65 actively listens for data updates to see what changes are made to documents 16 as they occur by tapping into the information flow from application servers 14 (via communications link 15 and/or communications link 17), and accumulates those data updates, and depending on a time schedule or how important the data updates are, forwards the data updates to a distribution system 55 (via communications link 16) and/or query servers 30 (via communications link 19). The updates made to document 16 are referred to as data updates or document updates in various embodiments.

Data, which are stored in database 18 may be stored in a relational database format and are converted to an inverted database format, which can be accessed by a query engine (not shown) in query node servers 30, according to an example embodiment. The index information 26 may include an inverted index (not shown) and document information (not shown) in example embodiments. An inverted index, as is well known in the art, is an index data structure storing a mapping from content (e.g., content contained by the document 16), such as words or numbers, to its locations in a database file, or in a document (e.g., document 16) or a set of documents. The documents 16 (e.g., document data, column group data) and/or information contained by the documents 16 may be stored in the document information.

It is appreciated by one skilled in the art that the inverted index corresponds to the underlying database that it describes. Accordingly, any update to the underlying database is reflected in a corresponding update to the inverted index. Updates to the database 28 may include the addition and deletion of documents 16 in the document information as well as the update of any of the contents contained by the documents 16 in the document information. In the present embodiment, the index information 26 may be updated to respond to a query in with accurate search results that include the most recent document information. To this end, the operations A-G are now further described.

The information storage and retrieval platform 11 includes multiple components including the application servers 14 that represent business event streams (BES) and may execute on one or more application server machines (not shown), the database 18, a database 20, an Hadoop distributed file system (HDFS) 23, the database 28, the query node servers 30 that operate on query node server machines (not shown), a Hadoop cluster 44 comprised of one or more Hadoop machines (not shown), a distribution system 55, search front-end servers 58 that executes on search machines (not shown), and search back-end servers 60 that execute on search machines (not shown) as being communicatively coupled together. For example, the multiple components may be communicatively coupled with any combination of a wide area network, local area network, wireless network, or any other type of network utilizing various networking technologies.

At operation A, the document 16, or one or more elements of the document 16, may be communicated from the client machine 12 to the application servers 14 and stored in the database 18 (e.g., Oracle database). The document 16 may include multiple elements including elements a, b, c, d, e, and f that may include strings of text, numeric information, scores, or other discrete quantum of information that are positioned in different sections or fields of the document (e.g., item information).

At operation B, at the application servers 14 (BES), event manager modules (not shown) located within the application servers 14, may identify updates to database 18, generate events that correspond to the respective updates, prioritize the events according to the quality of the data in the event and communicate the prioritized events into event queues (not shown) that are consumed by consumer modules (not shown) that service the respective event queues.

According to an embodiment, the event manager modules and the consumer modules may utilize three event queues to process and prioritize event types. For example, the update of the "element a" in the document 16 in database 18 may be a price change to item information describing an item for sale that causes the generation of a corresponding event that is associated with a high priority that, in turn, is communicated into in a first event queue associated with high priority that, in turn, is received by the consumer module. Similarly, the update of the "element b" in document 16 in database 18 may be a change to a title of the item that causes the generation of an event that is associated with a medium priority that, in turn, is communicated into a second event queue associated with the medium priority that, in turn, is received by the consumer module. Finally, the update of the "element c" in document 16 in database 18 may be a change to a description of the item that causes the generation of an event that is communicated into a third event queue associated with a low priority that, in turn, is received by the consumer module. Accordingly, the three event queues may be utilized to communicate events in high, medium, and low priorities to facilitate a preference for the update of high priority events (e.g., price) over medium priority events (e.g., title) over low priority events (e.g., description). In some embodiments the priority for the respective event types may be configured. Other embodiments may include fewer or more event queues. The application servers 14 re-orders based on prioritized event types in various embodiments. The application servers 14 generate event notifications and publish the event notifications based on the re-ordering in example embodiments.

In further embodiments, NRT indexing subsystem 65 actively listens for data updates, such as updates to "element a", "element b" and "element c" described above, using a messaging queuing subsystem (not shown), such as KAFKA. The message queuing subsystem 511, shown in FIG. 5, may require a dedicated set of servers that execute on message queuing machines (not shown) for managing the message queues and provide storage for the messages in the message queues in various embodiments. In this example embodiment, BES 14 is a message publisher, and NRT indexing subsystem 65 is a message subscriber, subscribing to messages from the BES application within BES 14. In additional embodiments, as soon as events are triggered and event notifications generated by BES 14, a new message is published by message publisher BES 14, and received by message subscriber NRT indexing subsystem 65, such that the messages can be sent to indexing daemons (not shown), in almost real time. In various embodiments, the event notifications are published based on the re-ordering based on priorities by BES 14. The messages received by NRT indexing subsystem 65 are event notifications, and not the actual data (also referred to as data updates or document updates) which are stored in HBbase 20. Further, as events are accumulated by NRT indexing subsystem 65, indexes (also referred to NRT-indexes 24) are generated based on certain thresholds and then immediately distributed to a distribution system 55 (via a normal or slow path 16 which is most reliable) or directly to query node servers 30 (via fast path 19 and less reliable), or to both paths 16 and 19. The NRT indexing subsystem 65, which is daemon based in various embodiments, has software code executed on servers (not shown) within NRT indexing subsystem 65 outside of Hadoop 40, but still uses the file system, HDFS 23, and database, Hadoop database (Hbase) 20, within Hadoop 40. For alternative embodiment, other files systems and/or databases may be used to implement NRT indexing subsystem 65.

The BES 14 outputs a dual stream of data by providing event notifications over communications link 15 to NRT indexing subsystem 65 (via message queuing subsystem 511) and actual data to Hadoop 40 over communications link 22. At operation C, the consumer modules within BES 14 may transform the actual data in the events and communicate the transformed data via an HBase application programming interface to an HBase master server (not shown) in Hadoop cluster 44 that, in turn, stores the transformed data in one or more tables including an items table 21 in Hbase 20. The transformed data (also referred to as transformed document updates) may be stored according to regions that are managed by region server processes (not shown). According to an embodiment, the Hadoop database 20 may be embodied as an open source non-relational, distributed database (e.g., HBase) that runs on a Hadoop Distributed File System (HDFS) 23. HDFS 23 is an open source software framework that supports data-intensive distributed applications, known by those skilled in the art. The HDFS 23 is a distributed file storage system using disk drives that are part of Hadoop cluster 44, where the HDFS 23 storage is managed by software running on Hadoop cluster 44. In alternative embodiments, other types of file systems may be used to implement various embodiments described herein.

The Hadoop cluster 44 may further include an HBase master server (not shown) that is utilized to manage the HBase/HDFS environment, a scheduler module (not shown), and an HBase/Hadoop node (not shown) that includes multiple region server processes (not shown) and a map-reduce job module (not shown). Each region server process may further be associated with a column (not shown) that corresponds to a range of documents (e.g., or items corresponding to item information in the items table 21) and may be utilized to manage one or more regions (not shown) that respectively correspond to a range of the documents 16. For example, the documents 16 may be uniquely identified with document identifiers (e.g., item identifiers) that are numbered from 0 to X where each column and region are dedicated to respective overlapping predetermined ranges of documents (e.g., documents (0-100) and documents (0-50)), as described further in this document. According to one embodiment, the number of region server processes may be in the hundreds but scaling is not limited to any fixed number. HBase is a technology that provides a fault-tolerant way of storing large quantities of sparse data featuring compression, in-memory operation, and a space-efficient probabilistic data structure (e.g., Bloom filters) on a per-column basis as outlined in the original BigTable paper, as is known by those skilled in the art. An items table 21 in the HBase 20 may serve as the input for one or more map-reduce jobs that are scheduled by the map-reduce job module for building full indexes in various embodiments. The map-reduce jobs may be embodied as a map jobs and reduce jobs that runs in Hadoop 40. The items table 21 in the database 20 may further be accessed through the Java Application Programming Interface (API) but also through representational state transfer (REST) architecture and other APIs.

In further embodiments, Hbase 20, including items table 21, may be accessed by NRT indexing subsystem 65 to retrieve actual data required for transporting and processing the data within NRT indexing subsystem 65, and for further distribution to query node servers 30. The actual data updates received by NRT indexing subsystem 65 are received in-order, however, the event notifications may received out-of-order. The BES 14 can process events out of order, based on the priority scheme described above (e.g., high, medium and low priority). The BES 14 will notify NRT indexing subsystem 65 (e.g. via KAFKA) of events in the order they were processed by BES 14. In other words, NRT indexing subsystem 65 will process in-order the events that were re-ordered by BES 14. Thus, NRT indexing subsystem 65 is processing event notifications in-order, or sequentially in time, received via a message queuing system 511. The "fast path" re-ordering done by NRT indexing subsystem 65 refers to the delivery of the processed index information (including document updates and indexes) to query nodes servers 30, but does not re-order processing by NRT indexing subsystem 65. Since the fast path has the risk of data loss, any update that is delivered via the fast path (via communications link 19) will typically be included in the NRT-index 24 that is delivered by the normal path (via communications link 16), which will all be in order.

At operation D, first generating sub-operation is executed by servers (not shown) in Hadoop cluster 44 as a map reduced job to generate full (also referred to as bulk) indexes that are subsequently distributed to the query node servers 30, in an example embodiment. At operation D, a second index generating sub-operation, executing on servers (not shown) located in an NRT indexing subsystem 65, generates NRT-indexes 24 are subsequently published to database(s) 28 and index information 26, in a form that can be consumed and served by query node servers 30. For example embodiments, the NRT-indexes 24 may be published on-demand or on a fixed schedule, and further published to one or more channels, such as distribution system 55 and/or query node servers 30.

The full-index may be a snapshot of the contents of items table 21 in the database 20. In one embodiment, the scheduler module may schedule the generation of the full-index twice in a twenty-four hour period. The scheduler module may generate a full-index that is associated with a start-time by scheduling a map-reduce job module. The map-reduce job module may initiate a map step that divides the job into smaller sub-jobs (e.g., map tasks) and multiple reduce steps that consume the output from the sub-jobs and aggregates results to generate the index information 26. A "look back" is a consequence of using a map-reduce job module, where once the build of a full map-reduce job is started, only the updates from before the map-reduce job started are assured to be included in the full index being built.

On the other hand, the NRT-indexes 24 are not implemented with a map-reduce job module, where a series of consecutive snapshots each snapshot captures one or more updates to items table 21 in Hbase 20 that occurred within an associated time period of time. Instead, the NRT-indexes 24 are built as soon as events occur and are triggered by BES 14, and new messages are sent to indexing daemons using a daemon coordinator, events are then accumulated, indexes are generated based on certain thresholds and may be immediately distributed. As a result, the NRT-index 24 include updates that arrive while it is building an NRT-index 24 essentially up to the point in time where the daemon coordinator stops building the NRT-index 24 and publishes its final results, according to an example embodiment. In other words, a daemon based NRT indexing subsystem is not limited to looking back to only before it started building an NRT-index 24 for updates. One analogy to compare a "look back" scheme with the NRT indexing scheme is getting news from a newspaper or from a live TV broadcast. When a person starts reading a newspaper, the "freshest" news in the newspaper is when the newspaper was first delivered, regardless of how long it takes to actually read (consume) the newspaper, which is similar to a "look back" scheme. A live TV news broadcast can add new stories after a person has started "consuming" the news, and thus the news can be as fresh as the last moment of the live broadcast, which is similar to an NRT indexing scheme.

Updates written to HBase 20 are often included in both NRT-indexes 24 and in full-indexes 22. For example, when a new item is listed for sale, it will be included in NRT-index 24 being built until the daemon coordinator stops building NRT-index 24 and publishes it, and also included in all future bulk indexes until the item has sold out or expired. One way to think of it is that each full-index is a "roll-up" of all prior updates that were delivered to query node servers 30 using NRT-indexes 24.

The full indexes 22 and NRT-indexes 24 may include a bill of material (BOM) information which describes the content of the full-indexes 22 and NRT-indexes 24, including the index information 26. The NRT-index 24 may include NRT-index 24 BOM information. The NRT-index 24 BOM information may be distributed as a separate file, rather than being integral to the NRT-indexes 24 in an example embodiment. The BOM describes which NRT-indexes 24 (produced by NRT indexing subsystem 65) should be "partnered" with any give full index (produced by Hadoop 40), according to one embodiment. The index information 26 may include the inverted index and document updates formatted to be consumed by query node servers 30, as previously described.

At operation E, distribution system 55 copies index files stored in HDFS 23 to local disks on the server machines that are part of query node servers 30. The distribution system 55 includes a command and control component (not shown), a storage component (not shown) for providing staging for data before being transported to query node servers 30, and one or more servers (not shown) that execute on server machines (not shown) to manage the transport of data into query node servers 30 and/or database(s) 28. The command and control component is monitoring what has been published to make sure all nodes within query node servers 30 get a copy of what is published and tracks what is published, what is in query server grid, and if query server is missing any data distribution system 55 distributes the missing data to that query node server in query node servers 30. In other words, the command and control component is paying attention to what is the current status of all query nodes to make sure whatever is published is delivered to all query node servers 30.

The distribution system 55 is also responsible for notifying query node servers 30 that a new index has arrived and coordinates the activation sequence where a subset of query node servers 30 stop serving queries so that they can switch over to the new index and start serving the new index, followed by a next subset of query node servers 30 that stop using the old index and start using the new index, etc. until all query node servers 30 are using/serving the new index.

For an example embodiment, distribution system 55 may be a custom built system for software and data deployment, more specifically, delivering both software/data to a large set of servers, and also "activating" the software/data once it has been delivered. The data deployment capabilities of distribution system 55 may be used to deliver indexes for various embodiments.

The distribution system 55 receives NRT-indexes 24 from NRT indexing subsystem 65 which includes updated documents (or actual data) along with the "inverted index" information, which was retrieved from Hbase 20 and further processed by NRT subsystem 65, in example embodiments. In further embodiments, distribution system 55 receives full-indexes 22 from Hadoop 40. The distribution of the full-indexes 22 to the query node servers 30 may be over a network utilizing a distribution system 55 based on Bit Torrent, a peer to peer file sharing protocol in an example embodiment.

Since all nodes within query node servers 30 receive a copy of what is published, it may be desirable to reduce the amount of processing logic required at each node. Although query node servers may include components for monitoring events and/or processing documents, query node servers 30 do not include these functions within query node servers 30 to reduce overall cost of the query server stack (i.e., query node servers 30), in some embodiments. As mentioned above, any index information 26 (including updated documents or actual data, and inverted index data) gets copied into every single node in query node servers 30 and to include such components or processing logic at every node would significantly increase the hardware cost at each node. Query node servers 30 receive index information 26 from NRT indexing subsystem 65 in a form that is cheaper for query node servers 30 to consume. In various embodiments, monitoring and document processing functions are performed by NRT indexing subsystem 65 (only once rather than multiple times by multiple nodes) before being copied into query node servers 30.

At operation F, each of the query node servers 30 may receive full-indexes 22 and associated NRT-indexes 24. The query node servers 30 may be comprised of a search grid that is arranged in columns of query node servers 30, as described later in this document. Each column of query node servers 30 may be utilized to manage a range of the documents 16, as previously mentioned. The index information 26 may be stored in memory of the query node servers 30 and in the database 28 connected to the query node servers 30. The index information 26 may be updated with full-index 22 responsive to its arrival at the query node servers 30. Further, the index information 26 may be updated with the NRT-indexes 24 responsive to its arrival at the query node servers 30. The index information 26 is generally updated in sequential order. For example, the index information 26 is generally updated at the query node server 30 in the order in which the full-indexes 24 and the NRT-indexes 24 are generated. Any fast path updates are not included in the BOM in an example embodiment. The BOM only includes updates packaged into NRT-indexes 24 in various embodiments. To this end, the NRT-index 24 may be associated with NRT-index 24 BOM information and are utilized by the query node server 30 to manage the update of the index information 26. Database(s) 28 represents indexes residing on query node servers 30. In other words, database(s) 28 is the output of the index generation system (either full-index 22 produced from Hadoop 40 or NRT-index 24 produced from NRT indexing subsystem 65) and refers to the indexes after they have been distributed to the query node servers 30. The data stored in database(s) 28 is in a format that is easily consumed by the query node servers 30.

At operation G, a second user who operates the client machine 33 may enter a query that may be communicated over a network (e.g., Internet) via front-end servers 58 and back-end servers 60 to be received by the query node servers 30 which may be divided into two layers. The two layers may include an aggregation layer and a query execution layer. The aggregation layer may include a query node server 30 that includes a query engine (not shown) that receives the query that, in turn, communicates the query to multiple query engines that respectively execute in the execution layer in multiple query node servers 30 that correspond to the columns. The query engines in the query execution layer may, in turn, respectively apply the same query, in parallel, against respective the index information 26 that were generated for a range of document identifiers (e.g., column) to identify search results (e.g., document 16) in parallel. Finally, the query engines, at each query node server 30 in the query execution layer, may communicate their respective partial search results to the query engine in the aggregation layer which aggregates the multiple sets of partial search results to form a search result for the entire index information 26 and to communicate the search result over the network to the second user.

Figure 2A:
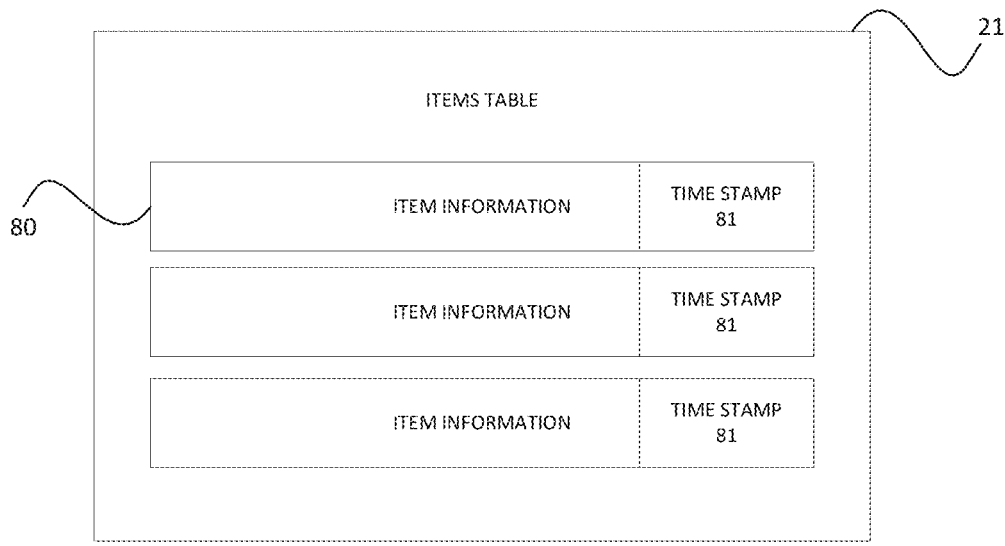
FIG. 2A is a block diagram that illustrates an items table, according to an embodiment.

FIG. 2A is a block diagram that illustrates an items table 21, according to an embodiment. The items table 21 may be stored in an Hbase 20 (shown in FIG. 1) that is time-stamped. The items table 21 may include multiple entries of item information 80. According to one embodiment an entry of item information 80 may be in the form of a document, a listing that describes an item or service that is for sale on a network-based marketplace, or some other unit of information. The item information 80 may be associated with a time-stamp 81. The time-stamp 81 stores a time the item information 80 was most recently added, deleted, or modified. For one embodiment, NRT indexing subsystem 65 uses a message queuing subsystem like KAFKA to be notified of updates, and may not need to scan for timestamps in HBase 20 to discover recent updates.

For example embodiments, the timestamps are used to write to HBase 20 to make sure that even if updates are written out of order to HBase 20, any read from HBase 20 will always get the data with the latest timestamp. In other words, if an "old" update is written to HBase 20 after a "new" update (an out of order scenario), the old update will have an older timestamp than the new update, and a read from HBase 20 will return the update with the newest timestamp. Thus, data retrieved by NRT indexing subsystem 65 are retrieved in-order.

Figure 2B:
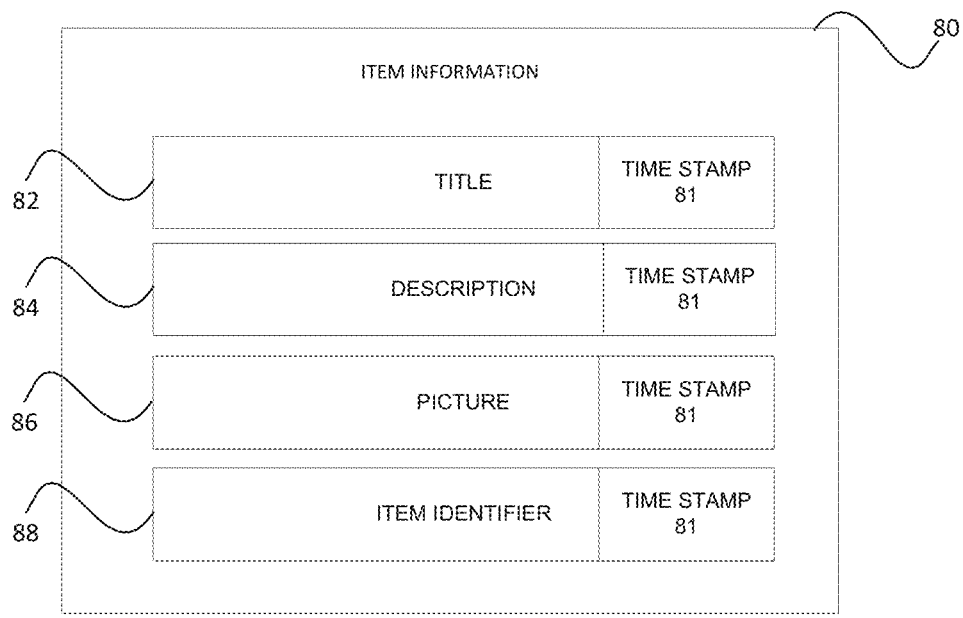
FIG. 2B is a block diagram that illustrates the item information, according to an embodiment.

FIG. 2B is a block diagram that illustrates item information 80, according to an embodiment. The item information 80 may include fields that describe the item (e.g., document, product, service). According to one embodiment the fields may include a title 82 that includes alphanumeric text, a description 84 that includes alphanumeric text, a picture 86 of the item, and an item identifier 88 (e.g., 64 bit) that uniquely identifies the item information 80 from other entries in the items table 21. Each of the fields may be associated with a time-stamp 81. The time-stamp 81 stores a time the field was most recently added, deleted, or modified.

Figure 3A:
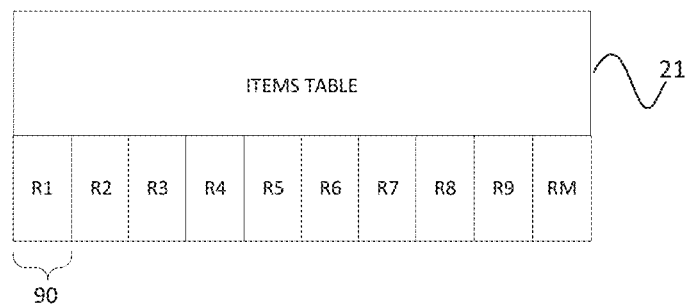
FIG. 3A is a block diagram that illustrates the items table in association with regions, according to an embodiment.

FIG. 3A is a block diagram illustrating an items table 21 in association with regions 90 (e.g., R1-RM), according to an embodiment. The items table 21 may be logically divided into regions 90. Each region 90 is a logical construct that corresponds to a predetermined number of items (e.g., item information 80, documents, etc.) in the items table 21 that utilize a particular range of item identifiers. Segmentation of the items table 21 into regions 90 may facilitate an efficient generation of the index information 26. For example, in one embodiment, the region 90*s* may be associated map tasks that may be executed with multiple Hadoop nodes (e.g., machines within Hadoop cluster 44) to process the items in the respective regions 90 to generate the index information 26 for full-indexes 22. For various embodiments, segmentation of the items table 21 into regions 90 may facilitate an efficient generation of the index information 26 for NRT-indexes 24 to provide better fault tolerance where if any region(s) is temporarily unavailable, then NRT indexing subsystem 65 may continue processing updates contained in the remaining available regions. Once the problematic regions become available again, the NRT indexing subsystem 65 may process any backlog of updates on those regions. The number of regions 90 and the Hadoop nodes may be scaled. In some embodiments, the regions 90 may further be divided into sub-regions that may be associated with sub-tasks that may be utilized to parallel process the items in the region 90.

Figure 3B:
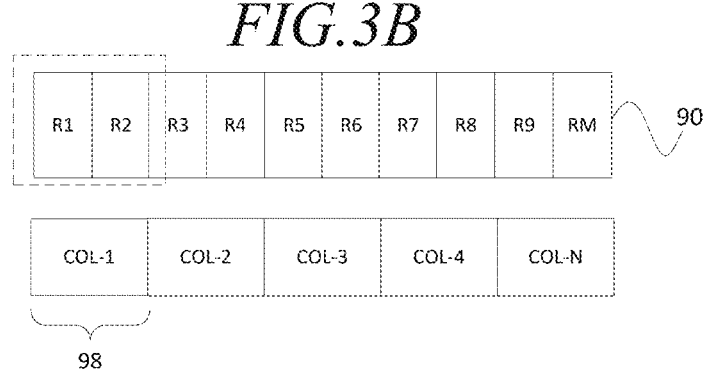
FIG. 3B is a block diagram that illustrates regions in association with a column, a column of query node servers and a grid of query node servers, according to an embodiment.
Figure 3B:
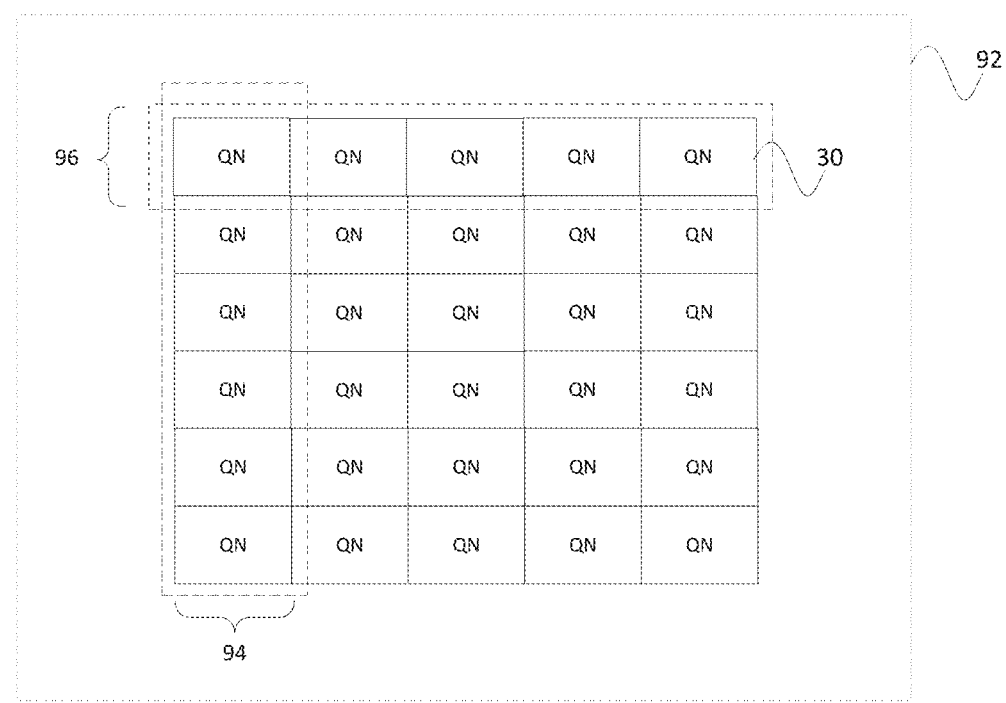

FIG. 3B is a block diagram illustrating regions 90 in association with a column 98, a column of query node servers 94 and a grid 92 of query node servers 30, according to an embodiment. The grid 92 of servers is comprised of query node servers 30 (e.g., QN) that are arranged in query node columns 94 and query node rows 96. The grid 92 may be utilized to process a query by applying the query to index information 26 (shown in FIG. 1) that is stored at each of the query node servers 30. It may be recalled that each region 90 is a logical construct that corresponds to a predetermined number of items (e.g., item information, documents, etc.) that utilize a particular range of item identifiers in the items table 21. FIG. 3B further illustrates, according to an embodiment, the regions 90 (e.g., R1-RM) that respectively correspond to columns 98 (COL-1-COL-N) that respectively correspond query node columns 94. The column 98 is a logical construct that corresponds to a predetermined number of items (e.g., item information, documents, etc.) that utilize a particular range of item identifiers in the items table 21. Segmentation of the grid 92 into columns facilitates efficient processing of a query.

For example, a query (e.g., Ipod Nano) may be processed by a single query node server 30 in each query node column 94 of the grid 92, in parallel, to generate search results that are subsequently aggregated together to form the search results. The column 98 may be identified with a column identifier. The query node columns 94 and the query node rows 96 may be independently scaled. The query node rows 96 may be increased to maximize throughput in processing a query and decreased to minimize the resources utilized to process the query. The query node columns 94 may be increased to accommodate an increase in the size of the items table 21 and decreased to accommodate a decrease in the size of the items table 21.

In various embodiments, it may be beneficial to keep the processing resources within each of the query node servers 30 simple, since all data updates are copied into each of the query node servers 30, and subsequently processed to generate search results. For example, processing resources required for active listening and document processing may not be included in query node servers 30 and may be performed prior to being distributed to query node servers 30, such that the resources for performing active listening and document processing are required only once. For example, NRT indexing subsystem 65 may perform active listening and document processing functions in addition to many other functions to simplify the data stored in database(s) 28 to be consumed by query server nodes 30 for improving the time from when user 2 makes an update to document 16 and such updates become available to user 3 via queries.

Figure 4A:
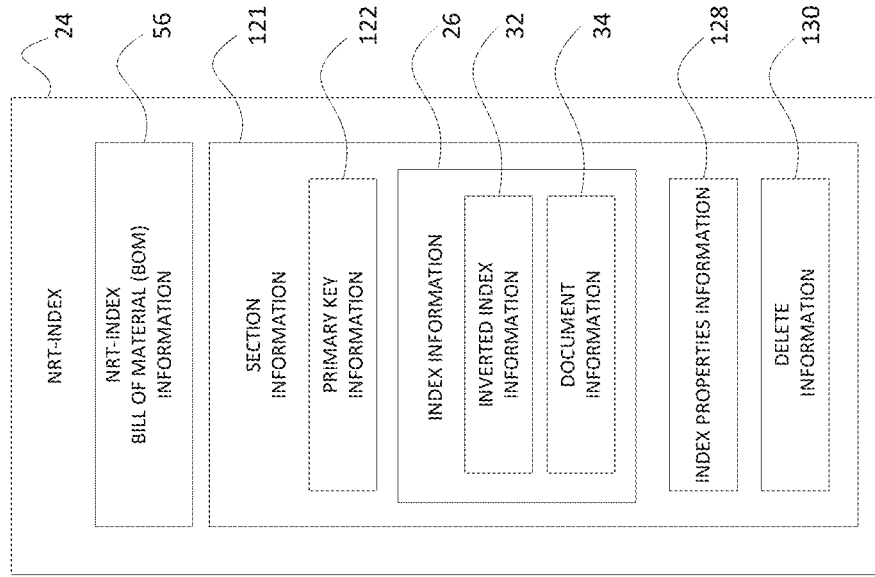
FIG. 4A is a block diagram illustrating a full-index, according to an embodiment.

FIG. 4A is a block diagram illustrating a full-index, according to an embodiment. The full-index 22 is based on a snapshot, at an instant in time, of a set of item information 80 which are identified in the items table 21 by a range of item identifiers 88 (e.g., column). The section information 121 may include primary key information 122, index information 26, and index properties information 128. The index information 26 is an abstraction of the inverted index 32 and document information 34 (e.g., column group information). The document information is a snapshot, at an instant in time, of a set of item information 80 which are identified in the items table 21 by a range of item identifiers 88 (e.g., column). The primary key information 122 may include an item identifier (e.g., 64 bit identifier) for the items in the column 98 and an internal logical item identifier for each of the items in the column 98. The inverted index 32 may include a posting list for the column 98 that utilizes internal logical item identifiers. The document information 34 may include an array of item information 80 for the items in the column 98 that may be accessed according to the internal logical item identifier. The inverted index 32 and the document information 34 may use internal item logical identifiers to identify item information 80 rather than the full 64 bit item identifier to reduce space requirements. The primary key information 122 may be utilized to perform mapping operations. For example, the primary key information 122 may be utilized to map an internal logical item identifier to the corresponding 64 bit item identifier. The reverse operation may also be performed. The index properties information 128 may include statistical information that is gathered while the full-index 22 is being generated.

Figure 4B:
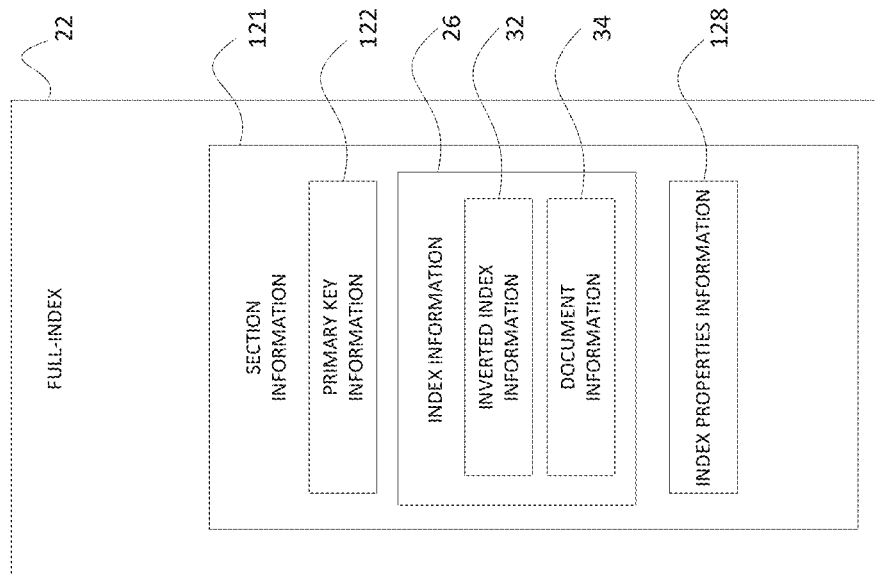
FIG. 4B is a block diagram illustrating a NRT-index 24, according to an embodiment.

FIG. 4B is a block diagram illustrating a NRT-index 24, according to an embodiment. The NRT-index 24 may be considered a mini-index. The NRT-index 24—provides an update to a set of item information 80 which are identified in the items table 21 by a range of item identifiers 88 (e.g., column). The NRT-index 24 may include the NRT-index 24 BOM information 54 and section information 121. For alternative embodiments, the NRT-index 24 BOM information 56 may not be integral with the NRT-index 24 22 and may be created as a separate file. The NRT-index 24 BOM information 56 describes which NRT-indexes 24 should be paired with which full-indexes. The section information 121 may include the same sections as the full-index 22 and a delete information 130 section. The document information 34 is a snapshot of changes to a set of item information 80 which are identified in the items table 21 by a range of item identifiers 88 (e.g., column). The inverted index 32 is a posting list that may enable access to the document information 34, as such. The index properties information 128 may include statistical information that is gathered while the NRT-index 24 is being generated. The delete information 130 may describe items (e.g., item information 80) that were deleted subsequent to the generation of the previous NRT-index 24.

Figure 5:
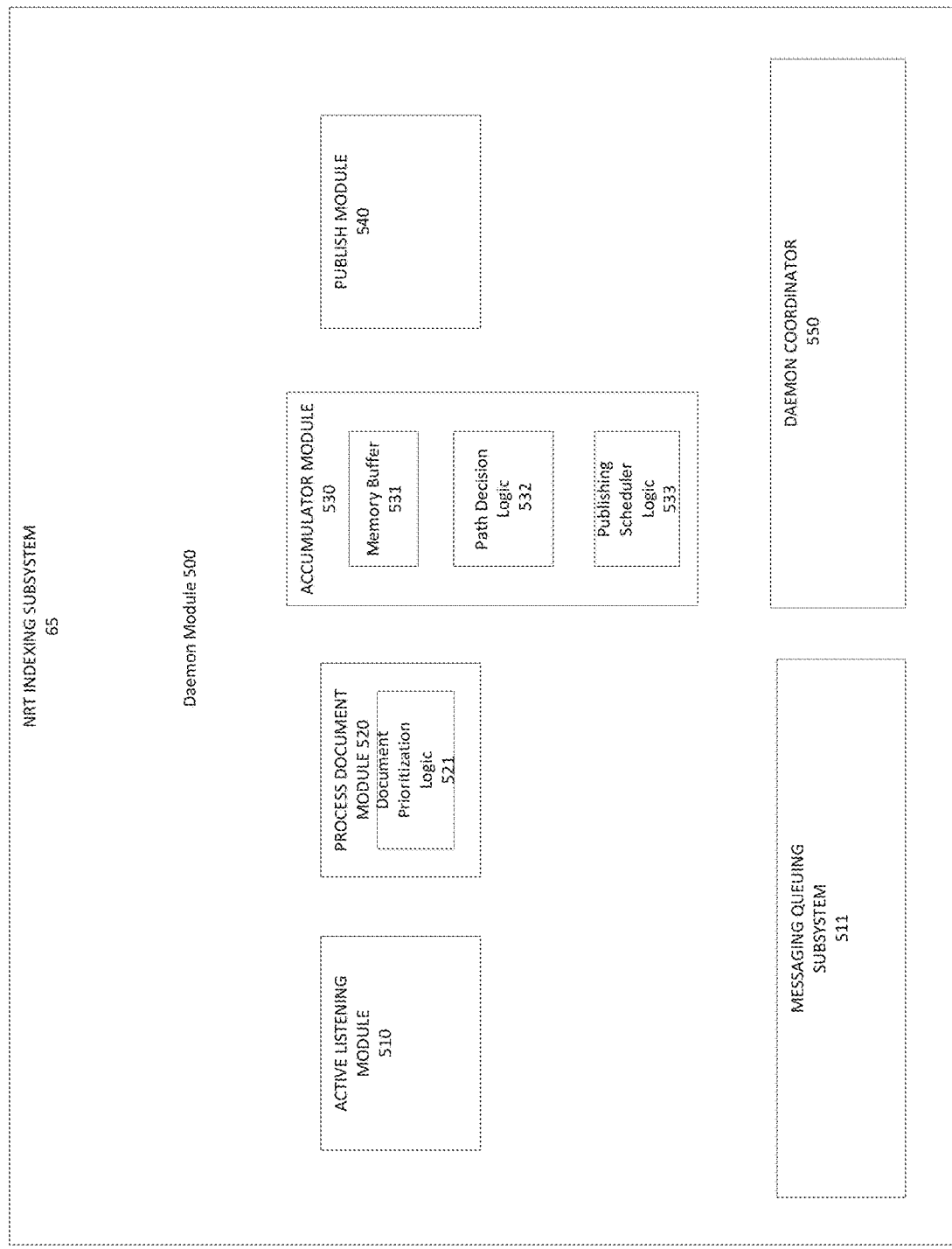
FIG. 5 is a block diagram illustrating a NRT indexing subsystem, according to an embodiment.

FIG. 5 illustrates a block diagram of an NRT indexing subsystem 65, according to an example embodiment. The NRT indexing subsystem 65 includes a daemon module 500 having indexing daemons (not shown), a monitor module 510, a process document module 520, an accumulator module 530, and a publish module 540. The indexing subsystem 65 also includes a daemon coordinator 550 and a message queuing subsystem 511. The NRT indexing subsystem 65 provides an active listening accumulator-based indexing subsystem to generate near real time indexing such that document 16 updates made by user 2 can be accessed in query results by user 3 relatively quickly, for example, 5 minutes. The NRT indexing subsystem 65 includes a combination of hardware and software capable of generating indexes (e.g., NRT-indexes 24) while utilizing a file system (such as HDSF 23) and a database for storing transformed data (such as Hbase 20), in example embodiments. The NRT-indexes 24 may be referred to as mini-indexes and the Bill of Material (BOM) data describes which NRT-indexes 24 should be paired with which full-indexes 24. For an example embodiment, the full-indexes 22 are produced by Hadoop 40 and the NRT-indexes 24 are produced by NRT indexing subsystem 65.

Although Hadoop 40 includes map-reduced indexing functionality, there are several advantages to performing indexing outside of Hadoop 40. For example, the map-reduced indexing system in Hadoop 40 relies on a "look back" time based window. For example, the Hadoop indexing system described in U.S. application Ser. No. 13/730,536, filed on Dec. 28, 2012, entitled, "SYSTEMS AND METHODS TO BUILD AND UTILIZE A SEARCH INFRASTRUCTURE, which is herein incorporated by reference in its entirety, wakes up every now and then (e.g., every 3 minutes for mini-indexing) and "looks back" to see what changes are made in the indexing database and then starts building the mini-index. On the other hand, NRT indexing subsystem 65, which operates on servers machines outside of Hadoop 40, actively listens for events (or data updates) and as those events happen, starts accumulating those document updates and "inverted index" data (which subsequently gets stored as indexing information 26), and based on a time schedule or what is important, publishes those updates to one or more channels. As such, the NRT indexing subsystem 65 may build and publish indexes faster than a Hadoop based indexing system.

The active listening module 510 performs active listening to identify data updates to database 18 that trigger events in BES 14. The data updates within BES 14 are transformed and then stored in Hbase 20 as transformed data stored within Hadoop 40. The active listening module 510 receives event notifications over communications link 15. The transformed data (i.e., actual updates versus notifications) is retrieved from Hbase 20 over communications link 17 by NRT indexing subsystem 65 by either the active listening module 510 or process document module 520 in various embodiments. For various embodiments, HBase 20 supports random read/write access such that immediately after a write operation is completed on a record/document (i.e., updates), and subsequent read of the same record/document will see the results of the earlier update (also referred to read-after-write policy). To ensure NRT indexing subsystem 65 actually sees the updates, the application performing the update (e.g. application code running in the BES 14) will first write to HBase 20 before sending an update notification to NRT indexing subsystem 65, and given the HBase read-after-write policy, described above, by the time NRT indexing subsystem 65 receives the update notification, it is guaranteed that when it reads HBase 20 it will see the results of that update.

The active listening module 510 utilizes a message queuing subsystem 511. For an example embodiment, the messaging queuing subsystem 511 is a KAFKA publish-subscribe messaging system written in Java on top of the Zookeepers synchronization service and designed to integrate with Hadoop 40. The message queuing subsystem 511 may require a dedicated set of servers and server machines (not shown) for managing the message queues and providing storage for the messages in the message queues in various embodiments. In this example embodiment, BES 14 is a message publisher, and NRT indexing subsystem 65 is a message subscriber subscribing to messages from the BES application within BES 14. In additional embodiments, as soon as events are triggered by BES 14, a new message is published by message publisher BES 14, and received by message subscriber NRT indexing subsystem 65, such that the messages can be sent to indexing daemons within daemon module 500, in almost real time. The messages received by NRT indexing subsystem 65 are event notifications, and not the actual data (or updated documents) and "inverted-index" data which is stored in HBbase 20.

The daemon coordinator 550 keeps track of how much progress each indexing daemon had made in working through the messaging queue of message queuing subsystem 511 to make sure no updates are missed. The daemon coordinator 550, in one embodiment, is a software application which manages the state and work allocation for each of the daemon instances.

The process document module 520 is responsible for processing document updates and inverted indexes retrieved from Hbase 20. The process document module 520 also includes logic for prioritizing documents, as may be defined by the business needs or requirements in example embodiments. The Hbase 20 provides input to the process document module 520 over communications link 17. The documents received from Hbase 20 are in a format that needs to be converted such that the search engine in query node servers 30 can consume it. More specifically, the documents received from Hbase 20 comes in a form that appears very database like and needs some new information added to it and some information needs to be converted into a format that the search engine in query node servers 30 may use (e.g., "inverted-index" format). For example, the new information added may include, in addition to the item price in seller's local currency, the price is converted to US dollars based on most recent currency exchange rates. Further, data is analyzed and new data is added, such as how many occurrences, that can be used to enrich the document. As each document is received by NRT subsystem 65, it is processed by process document module 520. During the processing by process document module 520, the importance and/or prioritization of the documents are determined. For example embodiments, the prioritization of the document updates are determined by BES 14.

The accumulator module 530 includes a memory buffer 531, a path decision logic 532, and publishing scheduler logic 533. The accumulator module 530 stores the actual updates (retrieved from Hbase 20) in memory buffer 531. The path decision logic 532 is used to determine whether the document is to be published via fast path 19 (directly to query node servers 30) or slow or normal path 16 (to distribution system 55) or both (fast path 19 via query node servers 30 and safe (or normal) path 16 via distribution system 55). The re-ordering is a consequence of sending a high priority update via fast path 19 since the older lower priority updates will wait for a normal publish via path 16, and thus arrive after the later high priority update. The decision on what is high priority depends on business needs. It is generally more cost effective to send everything in batches as part of a normal publish cycle via path 16. But, if a business would like certain updates to reach query node servers 30 faster than the normal publish cycle, such as an item has just "sold out", then the fast path 19 route could be used to expedite delivery to query node servers 30. The accumulator module 530 may also have a publishing scheduler logic 533 to publish are regular intervals or when certain conditions are satisfied, for example, when there is a large rate of updates and the accumulator memory buffer has filled before the next scheduled publication time. For an example embodiment, the accumulator module 530 starts building in memory buffer 531 of all processed documents, stores them in RAM, and after a number of conditions are satisfied that tell the accumulator module 530 to stop saving processed documents to memory (e.g., RAM), and that these processed documents are to be published.

The publish module 540 is responsible to distribute updates to the query node servers 30 and/or the distribution system 55 as instructed by the accumulator module 530. The processed documents must be published by sending in a format that is easy to consume by the query node servers 30. The publish module 540 is not required to publish on a fixed schedule and may publish on demand, and may publish by more than one channel (e.g., path 16 for a normal publish to distribution system 55 or path 19 for a fast publish directly to query node servers 30). The distribution system 55 can distribute larger data packets with high reliability to make sure the data is not lost when being transferred to query node servers 30. Under certain circumstances, it may be beneficial to get the updates out fast, even if can't do it reliably. For one embodiment, logic within process document 520 determines the importance or prioritization of a document (e.g., based on information provided by BES 14, content of the processed document may be dropped) and then accumulator 530 indicates it is an important document that should be sent via the fast path 19 through publish module 540. The various channel options to publish include (1) a fast publish (but not a guaranteed path) straight to query node servers 30, (2) a slower and guaranteed path to distribution system 55, and (3) to send updates on both paths (1) and (2), according to example embodiments.

Many traditional index generating systems use a Hadoop map reduce index generation system that utilizes "look back" time windows so that all updates are included in at least one mini-index and some number of full/bulk indexes to understand what has been published. In other words, coordinating the time windows helps make sure an update is not missed. However, NRT indexing subsystem 65 (operating outside of Hadoop 40 to generate NRT-indexes 24) is daemon-based and does not use "look back" time windows (though it can be configured to run that way in alternative embodiments), and instead is implemented with a daemon coordinator 550 to keep track of how much progress each daemon has made in working through the message queue of updates in order to make sure no updates are missed. The updates are re-ordered in time for those that are more important by providing more than one publish channel (i.e., normal path and fast path).

In some embodiments, a system comprises an indexing subsystem (e.g., NRT indexing subsystem 65) to generate indexing information including document updates and indexes, the indexing subsystem receiving event notifications as the document updates are received and accumulating the index information until published; a query engine to update the index information 26 at a plurality of query node servers 30, the query engine to further receive a search query, over a network, from a client machine 33 and identify search requests based on the query and the index information 26; and a front-end server 58 to communication the search results, over the network, to the client machine 33.

In additional embodiments, the indexing subsystem (e.g., NRT indexing subsystem 65) further comprises a message queuing subsystem 511 having a message queue for event notifications of the document updates published by application servers 14 and subscribed to by the indexing subsystem. In other embodiment, the indexing subsystem (e.g., NRT indexing subsystem 65) further comprises a daemon coordinator 550 to coordinate the processing of the event notifications of the document updates in the message queue by indexing daemons.

In yet further embodiments, indexing subsystem (e.g., NRT indexing subsystem 65) receives the event notifications of the document updates as re-ordered by the application servers 65.

In other embodiments, the indexing subsystem (e.g., NRT indexing subsystem 65) further comprises a process document module 520 for retrieving the index information from a database (e.g., Hbase 20) and processing the index information to be consumed and served by the plurality of query node servers 30.

In further embodiments, indexing subsystem (e.g., NRT indexing subsystem 65) further comprises an accumulator module 530, the accumulator module 530 receiving index information from the process document module 520 and accumulating the index information in a memory.

In additional embodiments, the indexing subsystem (e.g., NRT indexing subsystem 65) further comprises a publish module 540 for publishing on-demand the accumulated index information. In other example embodiments, the publish module 540 publishes the accumulated index information to more than one publish channel. In further embodiments, the publish module 540 publishes to a distribution system for normal priority document updates and/or publishes to the query node servers for higher priority document updates.

The various modules and subsystems within NRT indexing subsystem 65 may be adapted, and/or additional structures may be provided, to provide alternative or additional functionalities beyond those specifically discussed with reference to FIG. 5. Examples of such alternative or additional functionalities will be discussed in reference to the flow diagrams discussed below.

Figure 6:
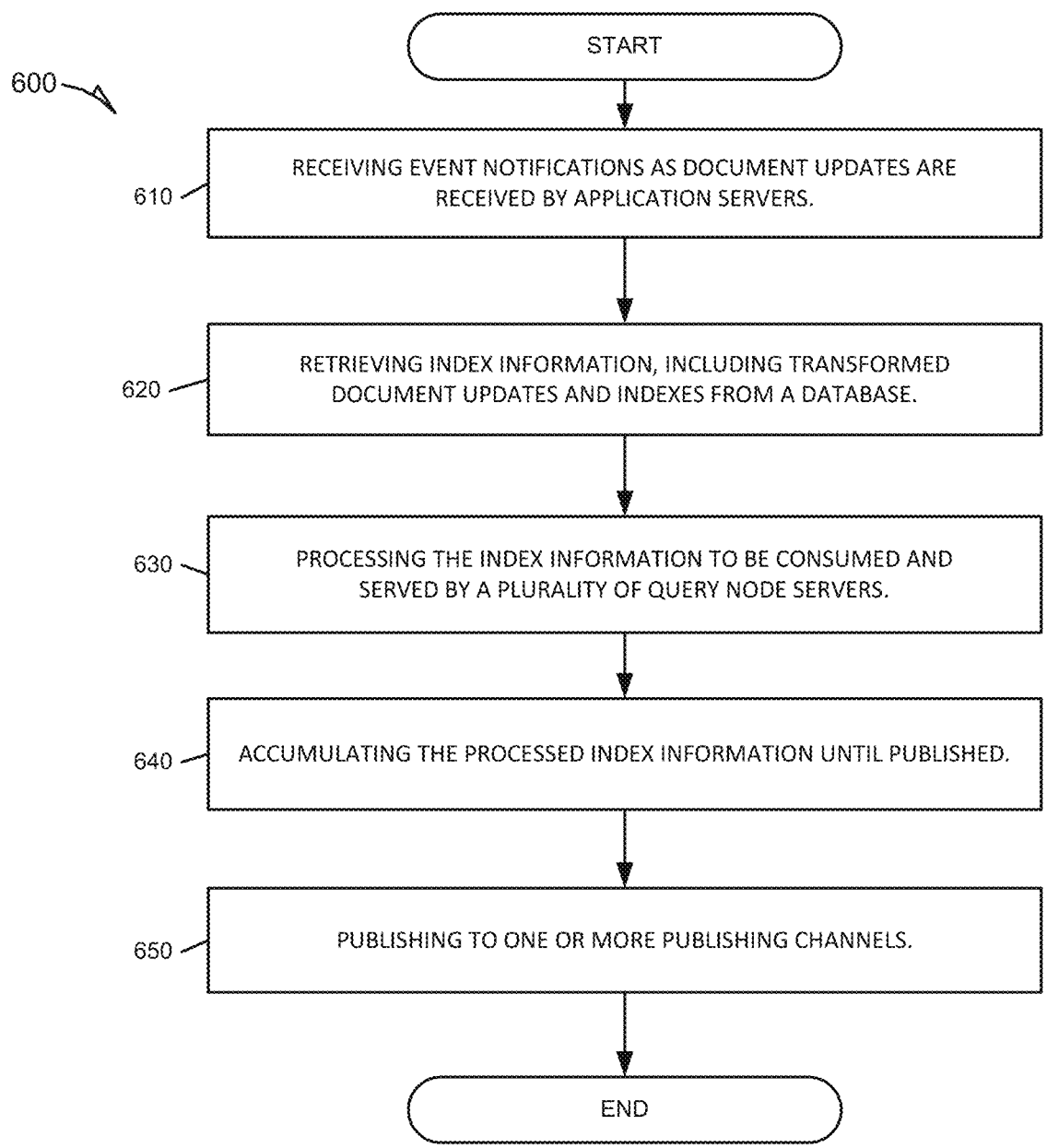
FIG. 6 is a flow diagram illustrating a method to generate and publish index information, according to an embodiment.
Figure 7:
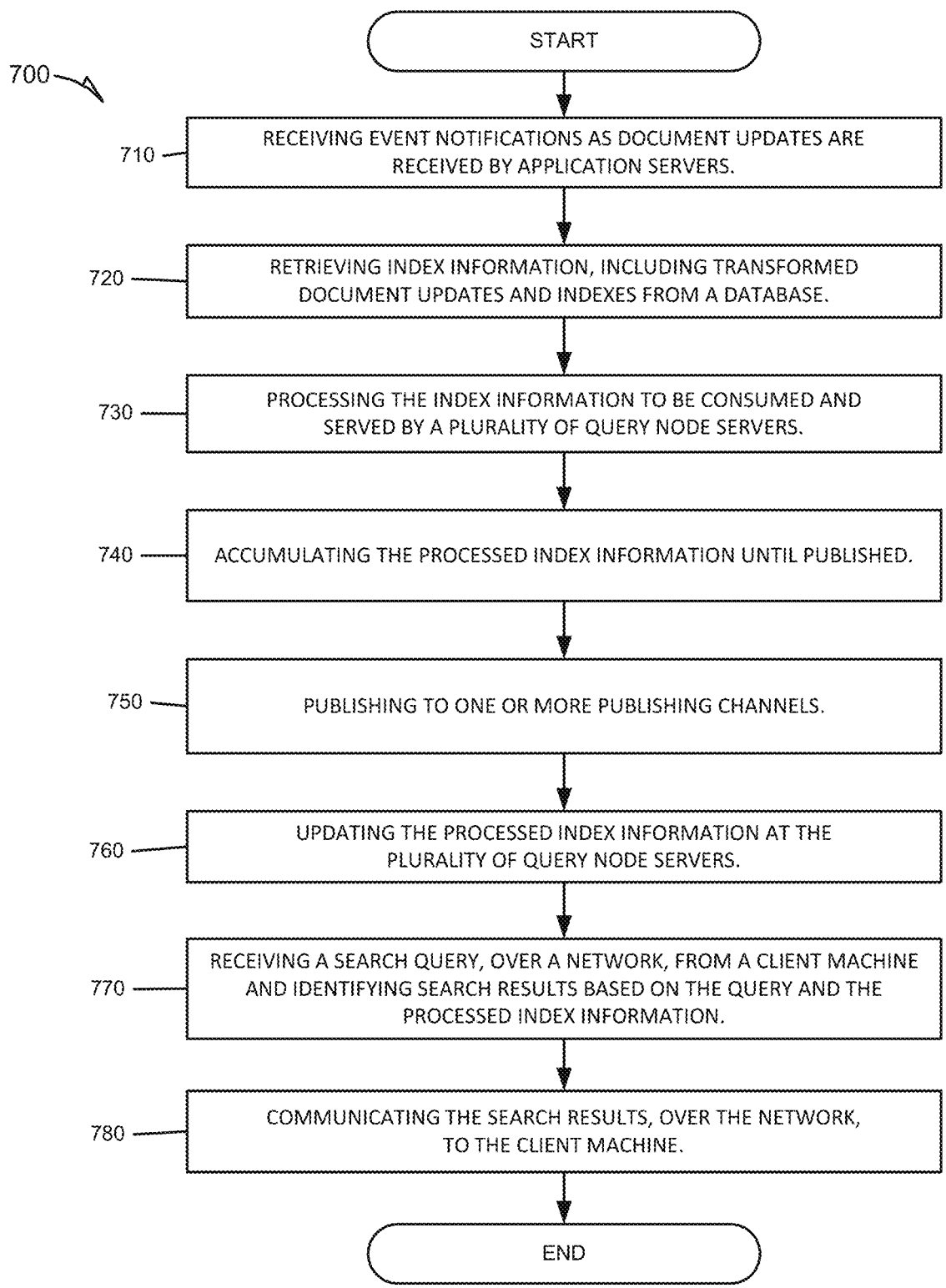
FIG. 7 is a flow diagram illustrating a method, according to an embodiment, to build and utilize a search index.
Figure 8:
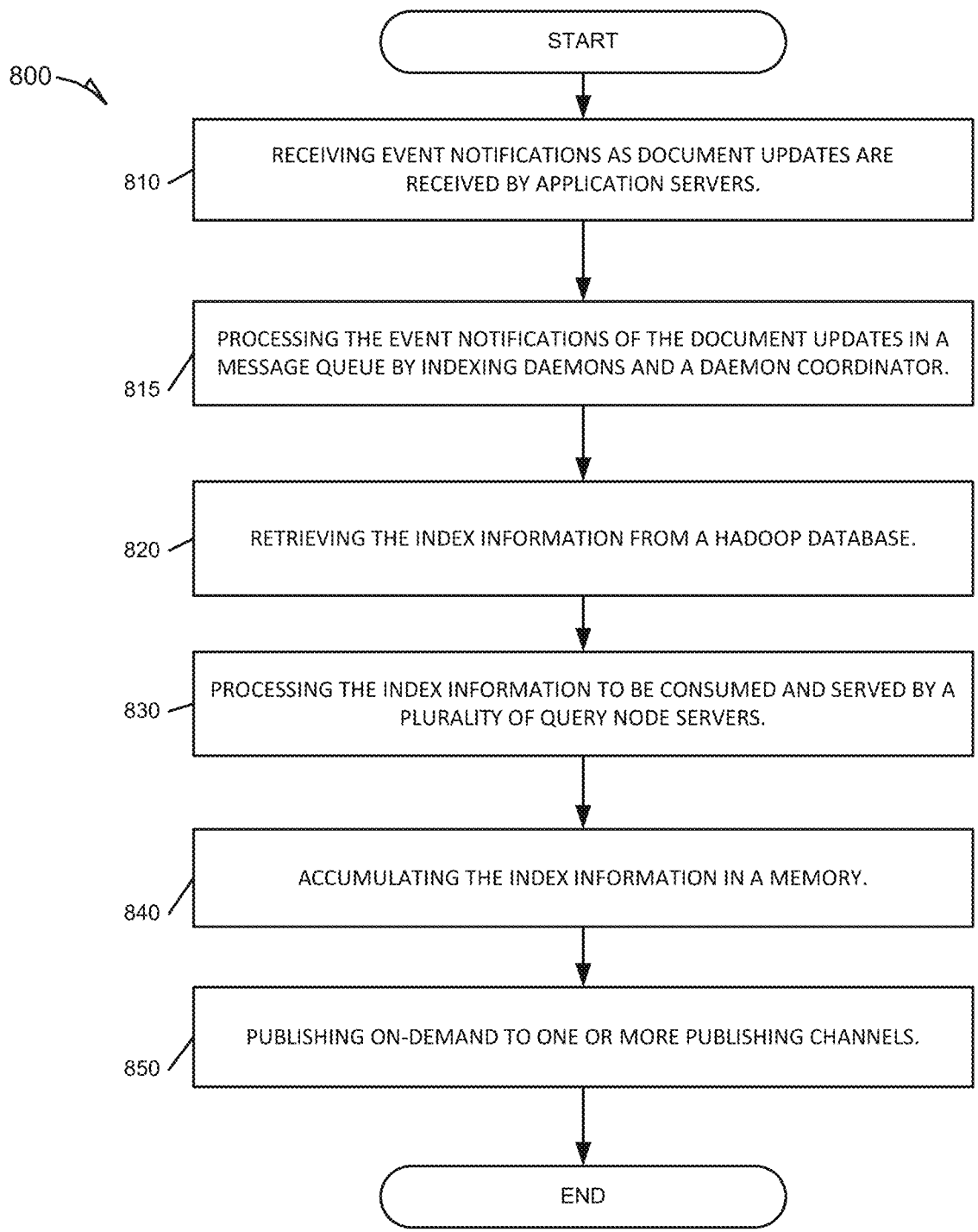
FIG. 8 is a flow diagram illustrating a method to generate and publish index information, according to another embodiment.

FIGS. 6-8 are processing flow charts illustrating example embodiments of methods to build and utilize a search infrastructure. In an example embodiment, the method 600 includes: at block 610, receiving event notifications as document updates are received by application servers; at block 620, retrieving index information, including transformed document updates and indexes from a database; at block 630, processing the index information to be consumed and served by a plurality of query node servers; at block 640, accumulating the processed index information until published; and at block 650, publishing to one or more publishing channels.

In an example embodiment, the method 700 includes: at block at block 710, receiving event notifications as document updates are received by application servers; at block 720, retrieving index information, including transformed document updates and indexes from a database; at block 730, processing the index information to be consumed and served by a plurality of query node servers; at block 740, accumulating the processed index information until published; at block 750, publishing to one or more publishing channels, at block 760, updating the processed index information at the plurality of query node servers; at block 770, receiving a search query, over a network, from a client machine and identifying search results based on the query and the processed index information; and at block 780, communicating the search results, over the network, to the client machine.

In an example embodiment, the method 800 includes: at block 810, receiving event notifications as document updates are received by application servers; at block 815, processing the event notifications of the document updates in a message queue by indexing daemons and a daemon coordinator; at block 820, retrieving the index information further comprises retrieving the index information from a Hadoop database; at block 830, processing the index information to be consumed and served by a plurality of query node servers; at block 840 accumulating the index information further comprises accumulating the index information in a memory; and at block 850, publishing to one or more publishing channels further comprises publishing on-demand. In further embodiments, receiving the event notifications of the document updates as re-ordered by the application servers. In yet other embodiments, publishing to a distribution system for normal priority document updates and/or publishing to the query node servers for higher priority document updates.

Example System Environment

Figure 9:
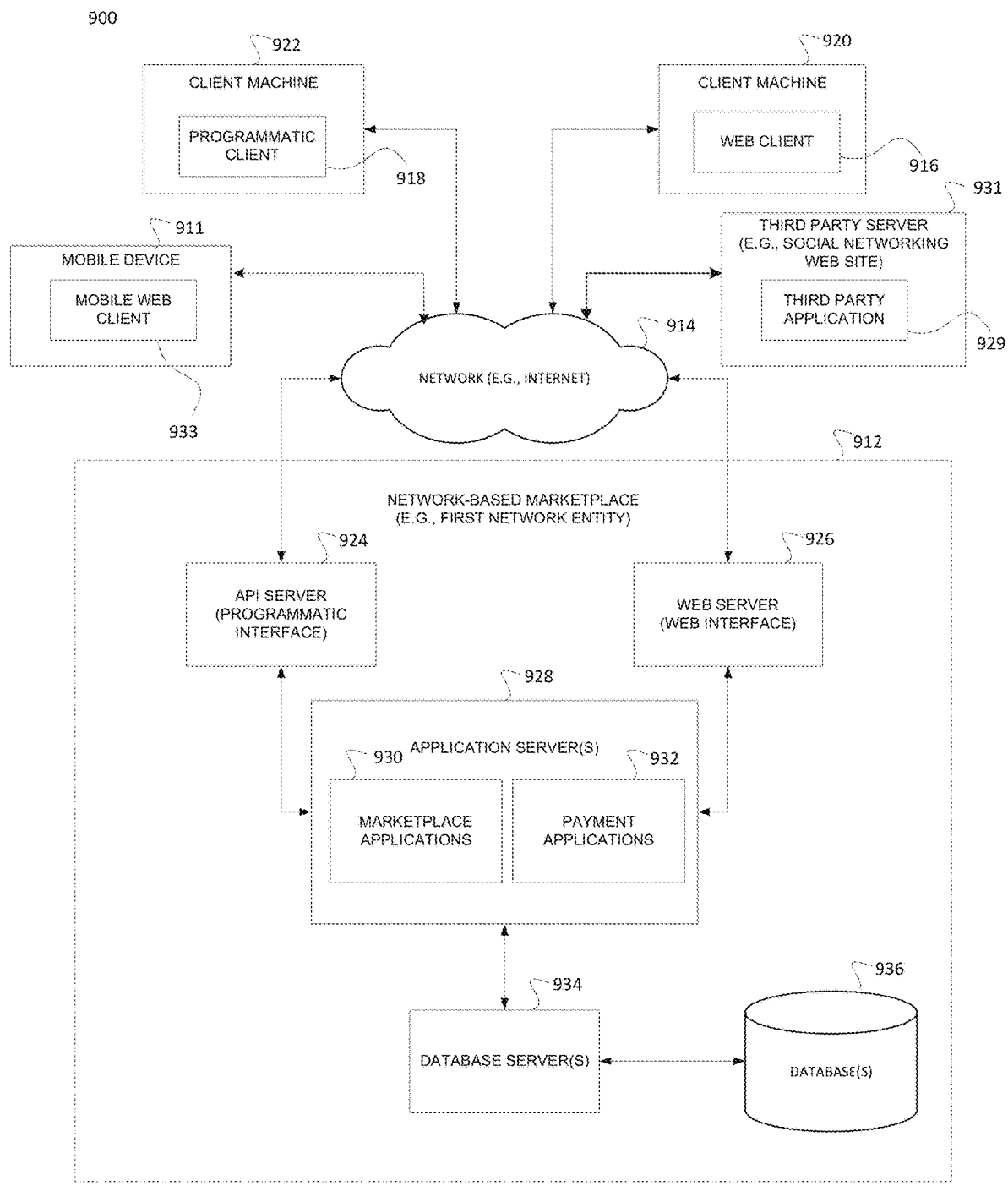
FIG. 9 is a network diagram depicting a networked system, according to an embodiment.

FIG. 9 is a network diagram depicting a networked system 900, within which one example embodiment may be deployed. The networked system 900 may embody the system 10 in FIG. 1 and, accordingly, the same or similar references have been used to indicate the same or similar features unless otherwise indicated. A network-based marketplace 912 provides server-side functionality, via a network 914 (e.g., the Internet or Wide Area Network (WAN)) to one or more clients. FIG. 9 illustrates, for example, a web client 916 (e.g., a browser, such as the Internet Explorer browser developed by Microsoft Corporation of Redmond, Wash. State) executing on client machine 920, a programmatic client 918 executing on client machine 922, and a mobile web client 933 executing on mobile device 911. For example, the mobile web client 933 may be embodied as one or more mobile modules that are used to support the Blackberry™ wireless hand held business or smart phone manufactured by Research In Motion of Waterloo, Ontario.

An Application Program Interface (API) server 924 and a web server 926 are coupled to, and provide programmatic and web interfaces respectively to, one or more application servers 928. The application servers 928 host one or more marketplace applications 930 and payment applications 932. The application servers 928 are, in turn, shown to be coupled to one or more database servers 934 that facilitate access to one or more databases 936

The marketplace applications 930 may provide a number of marketplace functions and services to users that access the network-based marketplace 912. The payment applications 932 may likewise provide a number of payment services and functions to users. The payment applications 932 may allow users to accumulate value in accounts and then to later redeem the accumulated value for products (e.g., goods or services) that are made available via the marketplace applications 930. The value may be accumulated in a commercial currency, such as the U.S. dollar, or a proprietary currency, such as "points." While the marketplace applications 930 and payment applications 932 are shown in FIG. 9 to both form part of the network-based marketplace 912, it will be appreciated that, in alternative embodiments, the payment applications 932 may form part of a payment service that is separate and distinct from the network-based marketplace 912.

Further, while the networked system 900 shown in FIG. 9 employs client-server architecture, embodiments of the present disclosure are of course not limited to such an architecture and could equally well find application in a distributed, or peer-to-peer, architecture system, for example. The various marketplace applications 930 and payment applications 932 could also be implemented as standalone software programs, which do not necessarily have networking capabilities.

The web client 916 and mobile web client 933 access the various marketplace applications 930 and payment applications 932 via the web interface supported by the web server 926. Similarly, the programmatic client 918 accesses the various services and functions provided by the marketplace applications 930 and payment applications 932 via the programmatic interface provided by the API server 924. The programmatic client 918 may, for example, be a seller application (e.g., the TurboLister application developed by eBay Inc., of San Jose, Calif.) to enable sellers to author and manage listings on the network-based marketplace 912 in an off-line manner, and to perform batch-mode communications between the programmatic client 918 and the network-based marketplace 912.

FIG. 9 also illustrates a third party application 929, executing on a third party server machine 931, as having programmatic access to the networked system 900 via the programmatic interface provided by the API server 924.

The mobile device 911 may be embodied as a mobile phone, a personal digital assistant (PDA), a cell phone, or any other wireless device that is capable of communicating with the network-based marketplace 912. For example, the mobile device 911 may be embodied as an iPhone mobile phone manufactured by Apple, Inc. of Cupertino, Calif. or, as previously mentioned, a Blackberry™ mobile phone manufactured by Research In Motion of Waterloo, Ontario.

Marketplace and Payment Applications

Figure 10:
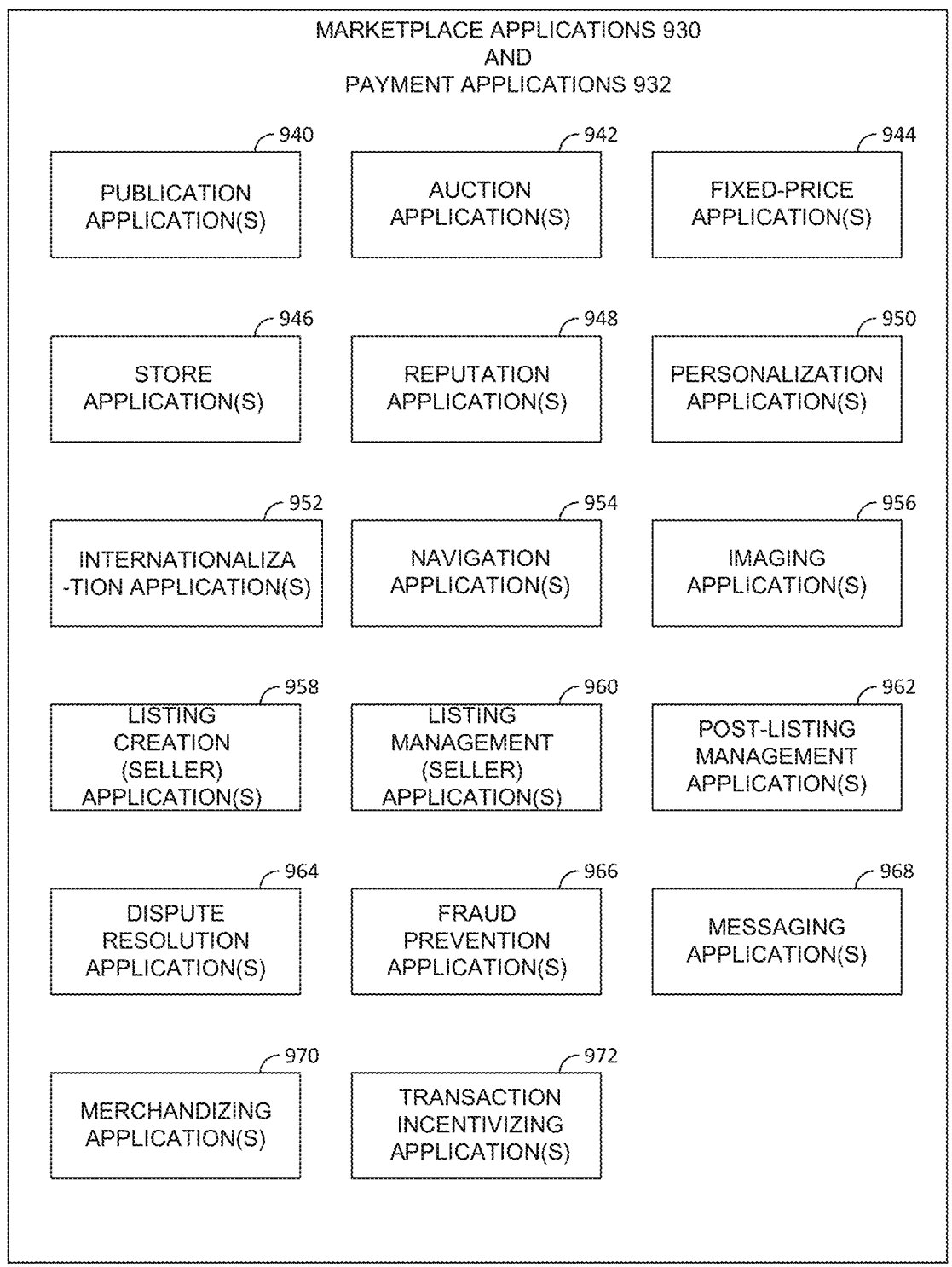
FIG. 10 is a block diagram illustrating marketplace and payment applications, according to an embodiment.

FIG. 10 is a block diagram illustrating marketplace applications 930 and payment applications 932 that, in one example embodiment, are provided as part of the networked system 900 of FIG. 9. The marketplace applications 930 and payment applications 932 may be hosted on dedicated or shared server machines, as shown on FIG. 9, that are communicatively coupled to enable communications between server machines. The applications themselves are communicatively coupled (e.g., via appropriate interfaces) to each other and to various data sources, so as to allow information to be passed between applications or so as to allow the applications to share and access common data. The applications may furthermore access one or more databases 936 via the database servers 934, as shown on FIG. 9.

The network-based marketplace 912 of FIG. 9 may provide a number of publishing, listing and price-setting mechanisms whereby a seller may list (or publish information concerning) goods or services for sale; a buyer can express interest in or indicate a desire to purchase such goods or services; and a price can be set for a transaction pertaining to the goods or services. To this end, the marketplace applications 930 are shown to include at least one publication application 940 and one or more auction applications 942 which support auction-format listing and price setting mechanisms (e.g., English, Dutch, Vickrey, Chinese, Double, Reverse auctions, etc.). The various auction applications 942 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 944 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings and may allow a buyer to purchase goods or services, which are also being offered for sale via an auction, for a fixed-price that is typically higher than the starting price of the auction.

Store application(s) 946 allows a seller to group listings within a "virtual" store, which may be branded and otherwise personalized by and for the seller. Such a virtual store may also offer promotions, incentives and features that are specific and personalized to a relevant seller.

Reputation applications 948 allow users that transact, utilizing the network-based marketplace 912, to establish, build and maintain reputations, which may be made available and published to potential trading partners. Consider that where, for example, the network-based marketplace 912 supports person-to-person trading, users may otherwise have no history or other reference information whereby the trustworthiness and credibility of potential trading partners may be assessed. The reputation applications 948 allow a user to establish a reputation within the network-based marketplace 912 over time, for example, through feedback provided by other transaction partners and by the computation of a feedback score based on the feedback. For example, the feedback score may be publicly displayed by the network-based marketplace 912. Other potential trading partners may then reference such a feedback score for the purposes of assessing credibility and trustworthiness.

Personalization applications 950 allow users of the network-based marketplace 912 to personalize various aspects of their interactions with the network-based marketplace 912. For example, a user may, utilizing an appropriate personalization application 950, create a personalized reference page at which information regarding transactions to which the user is (or has been) a party may be viewed. Further, a personalization application 950 may enable a user to personalize listings and other aspects of their interactions with the networked system 900 and other parties.

The networked system 900 may support a number of marketplaces that are customized, for example, for specific geographic regions. A version of the networked system 900 may be customized for the United Kingdom, whereas another version of the networked system 900 may be customized for the United States. Some of these versions may operate as an independent marketplace, or may be customized (or internationalized) presentations of a common underlying marketplace. The networked system 900 may accordingly include a number of internationalization applications 952 that customize information (and/or the presentation of information) by the networked system 900 according to predetermined criteria (e.g., geographic, demographic or marketplace criteria). For example, the internationalization applications 952 may be used to support the customization of information for a number of regional websites that are operated by the networked system 900 and that are accessible via respective servers 924 and 926 both of FIG. 9.

Navigation of the network-based marketplace 912 may be facilitated by one or more navigation applications 954. Merely for example, the navigation applications 954 may receive search information in the form of a query to search for items on the network-based marketplace and return search results responsive to the request. A browse application may allow users to browse various category, catalogue, or inventory data structures according to which listings may be classified within the networked system 900. Various other navigation applications may be provided to supplement the search and browsing applications.

In order to make listings available via the networked system 900 as visually informing and attractive as possible, the marketplace applications 930 may include one or more imaging applications 956 with which users may upload images for inclusion within listings. An imaging application 956 also operates to incorporate images within viewed listings. The imaging applications 956 may also support one or more promotional features, such as image galleries that are presented to potential buyers. For example, sellers may pay an additional fee to have an image included within a gallery of images for promoted items.

Listing creation applications 958 allow sellers to conveniently author listings pertaining to goods or services that they wish to transact via the network-based marketplace 912, while the listing management applications 960 allow sellers to manage such listings. Specifically, where a particular seller has authored and/or published a large number of listings, the management of such listings may present a challenge. The listing creation applications may further include a processing module, communication module, and listing module that facilitate a buyer watching for specific types of listings. The listing management applications 960 provide a number of features (e.g., auto-relisting, inventory level monitors, etc.) to assist the seller in managing such listings.

One or more post-listing management applications 962 may also assist sellers with a number of activities that may typically occur post-listing. For example, upon completion of an auction facilitated by one or more auction applications 942, a seller may wish to leave feedback regarding a particular buyer. To this end, a post-listing management application 962 may provide an interface to one or more reputation applications 948, so as to allow the seller conveniently to provide feedback regarding multiple buyers to the reputation applications 948.

Dispute resolution applications 964 provide mechanisms whereby disputes arising between transacting parties may be resolved. For example, the dispute resolution applications 964 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 966 implement fraud detection and prevention mechanisms to reduce the occurrence of fraud within the network-based marketplace 912.

Messaging applications 968 are responsible for the generation and delivery of messages to users of the network-based marketplace 912, with such messages, for example, advising users regarding the status of listings at the network-based marketplace 912 (e.g., providing "outbid" notices to bidders during an auction process or to providing promotional and merchandising information to users). Respective messaging applications 968 may utilize any one of a number of message delivery networks and platforms to deliver messages to users. For example, messaging applications 968 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi (e.g., IEEE 802.11 technologies including 802.11n, 802.11b, 802.11g, and 802.11a)), Worldwide Interoperability for Microwave Access (e.g., WiMAX—IEEE 802.16) networks.

Merchandising applications 970 support various merchandising functions that are made available to sellers to enable sellers to increase sales via the network-based marketplace 912. The merchandising applications 970 also operate the various merchandising features that may be invoked by sellers and may monitor and track the success of merchandising strategies employed by sellers. The transaction incentivizing applications 972 operate to provide incentives for buyers and sellers to enter into and complete transactions.

Data Structures

Figure 11:
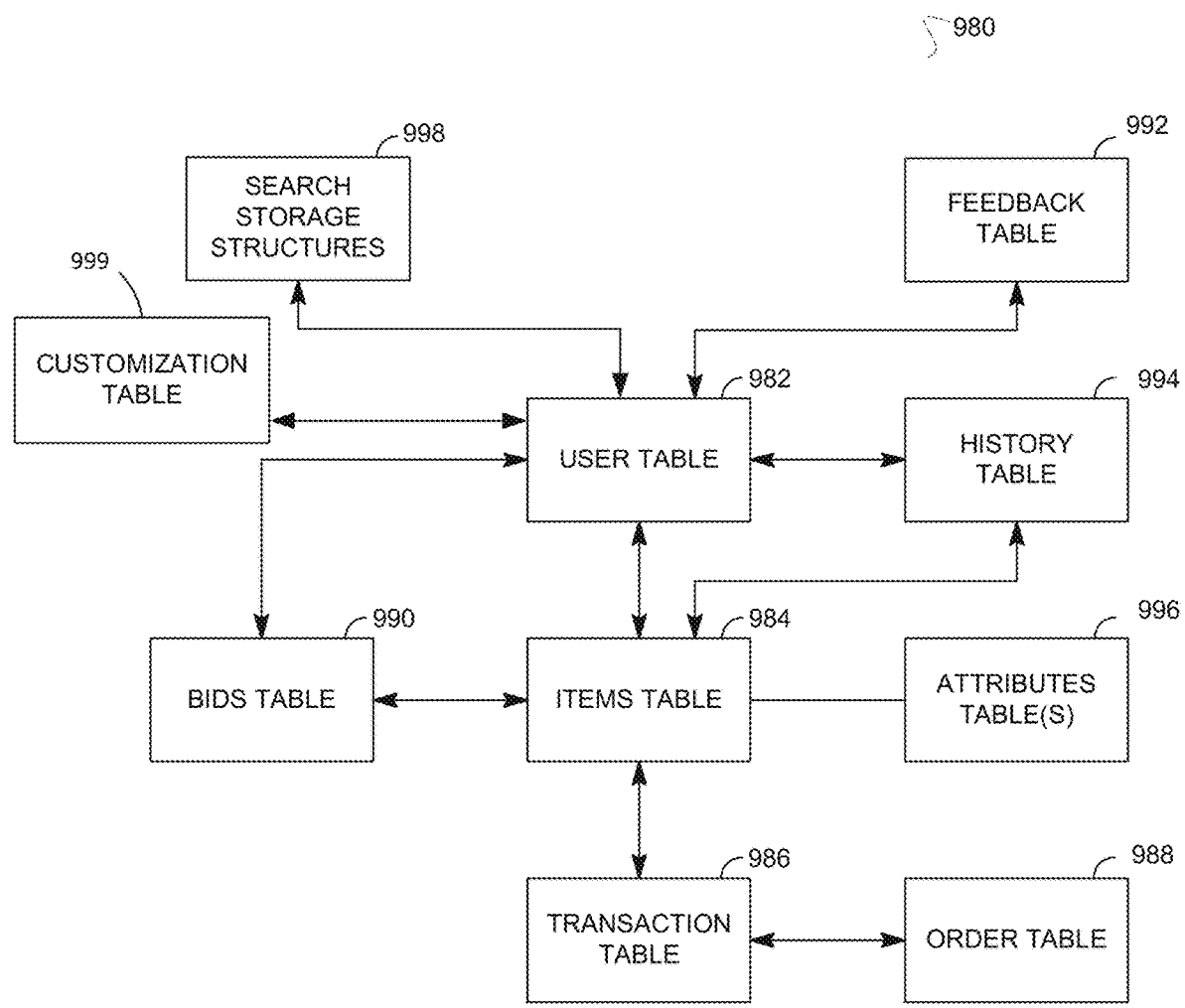
FIG. 11 is a high-level entity-relationship diagram, according to an embodiment.

FIG. 11 is a high-level entity-relationship diagram, illustrating various tables 980 storage structures that may be maintained within the databases 936 of FIG. 9, and that are utilized by and support the marketplace applications 930 and payment applications 932 both of FIG. 10. A user table 982 contains a record for registered users of the network-based marketplace 912 of FIG. 9. A user may operate as a seller, a buyer, or both, within the network-based marketplace 912. In one example embodiment, a buyer may be a user that has accumulated value (e.g., commercial or proprietary currency), and is accordingly able to exchange the accumulated value for items that are offered for sale by the network-based marketplace 912.

The tables 980 also include an items table 984 in which item records are maintained for goods and services that are available to be, or have been, transacted via the network-based marketplace 912. Item records within the items table 984 may furthermore be linked to one or more user records within the user table 982, so as to associate a seller and one or more actual or potential buyers with an item record.

A transaction table 986 contains a record for each transaction (e.g., a purchase or sale transaction or auction) pertaining to items for which records exist within the items table 984.

An order table 988 is populated with order records, with each order record being associated with an order. Each order, in turn, may be associated with one or more transactions for which records exist within the transaction table 986.

Bid records within a bids table 990 relate to a bid received at the network-based marketplace 912 in connection with an auction-format listing supported by an auction application 942 of FIG. 10. A feedback table 992 is utilized by one or more reputation applications 948 of FIG. 10, in one example embodiment, to construct and maintain reputation information concerning users in the form of a feedback score. A history table 994 maintains a history of transactions to which a user has been a party. One or more attributes tables 996 record attribute information pertaining to items for which records exist within the items table 984. Considering only a single example of such an attribute, the attributes tables 996 may indicate a currency attribute associated with a particular item, with the currency attribute identifying the currency of a price for the relevant item as specified in by a seller.

Search storage structures 998 may store information that is utilized to search the items table 984 and other tables. For example, the search storage structures 998 may be utilized by the system 10, as illustrated n FIG. 1, to build and utilize a search infrastructure, according to an embodiment. A customization table 999 may store customization records that may be utilized to customize the operation of the network-based marketplace 912.

Figure 12:
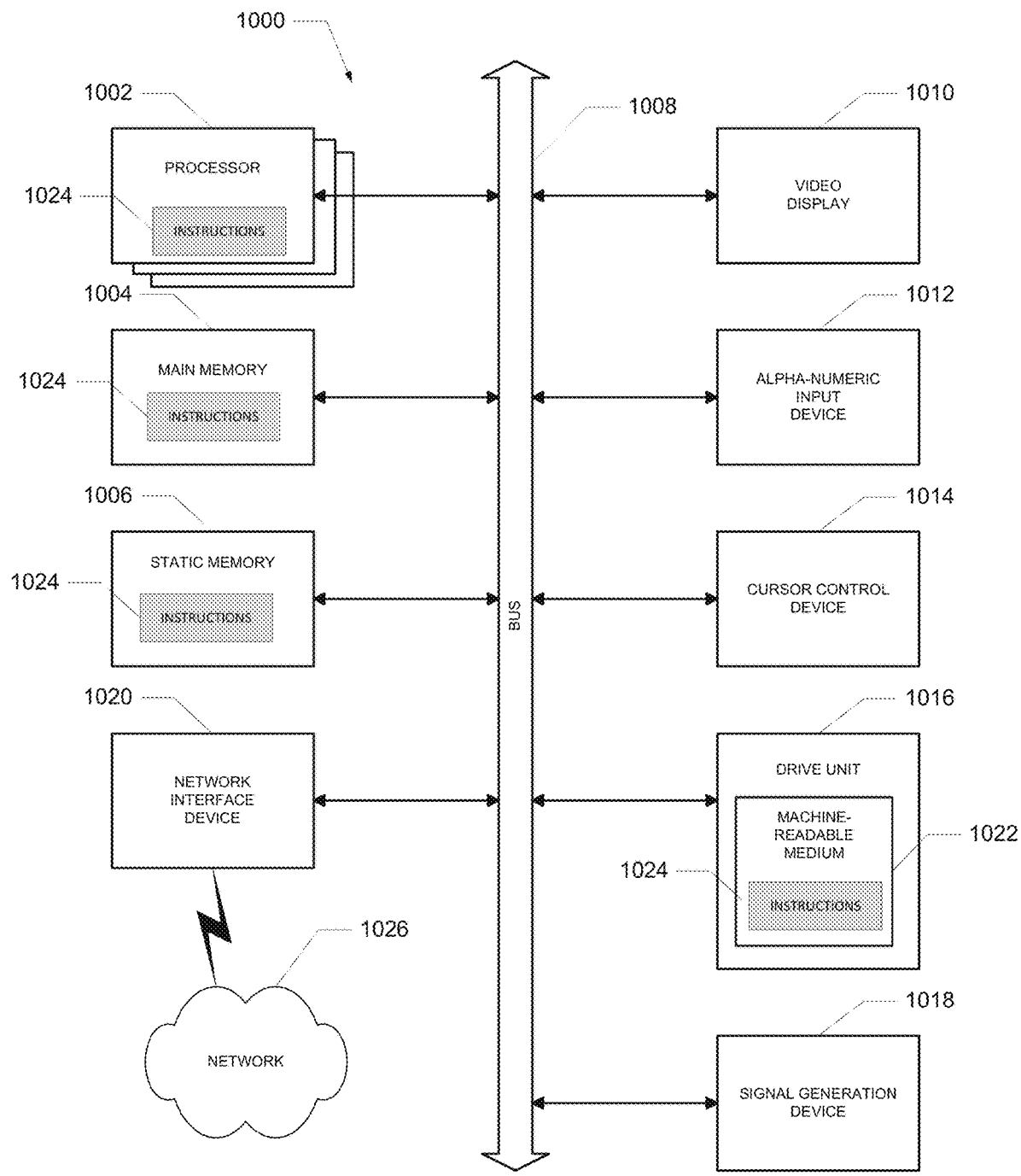
FIG. 12 shows a diagrammatic representation of a machine in the example form of a computer system, according to an example embodiment.

FIG. 12 shows a diagrammatic representation of a machine in the example form of a computer system 1000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a PDA, a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004 and a static memory 1006, which communicate with each other via a bus 1008. The computer system 1000 may further include a video display unit 1010 (e.g. a liquid crystal display (LCD) or a cathode ray tube (CRT)). The computer system 1000 also includes an input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein. The instructions (e.g., software 1024) may also reside, completely or at least partially, within the main memory 1004, the static memory 1006, and/or within the processor 1002 during execution thereof by the computer system 1000. The main memory 1004 and the processor 1002 also may constitute machine-readable media. The instructions 1024 may further be transmitted or received over a network 1026 via the network interface device 1020.

Applications that may include the apparatus and systems (and subsystems) of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical media and magnetic media. As noted, the software may be transmitted over a network using a transmission medium. The term "transmission medium" shall be taken to include any medium that is capable of storing, encoding or carrying instructions for transmission to and execution by the machine, and includes digital or analogue communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Software

In some embodiments, the methods described herein may be implemented in a distributed or non-distributed software application designed under a three-tier architecture paradigm, whereby the various components of computer code that implement this method may be categorized as belonging to one or more of these three tiers. Some embodiments may include a first tier as an interface (e.g., an interface tier) that is relatively free of application processing. Further, a second tier may be a logic tier that performs application processing in the form of logical/mathematical manipulations of data inputted through the interface level and communicates the results of these logical/mathematical manipulations to the interface tier and/or to a backend, or storage, tier. These logical/mathematical manipulations may relate to certain business rules or processes that govern the software application as a whole. A third, storage tier may be a persistent storage medium or non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as will be discussed below, a variety of technologies. This three-tier architecture, and the technologies through which it is implemented, may be executed on two or more computer systems organized in a server-client, peer-to-peer, or so some other suitable configuration. Further, these three tiers may be distributed between multiple computer systems as various software components.

Some example embodiments may include the above illustrated tiers, and processes or operations that make them up, as being written as one or more software components. Common to many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique. These components may be linked to other components via various APIs, and then compiled into one complete server, client, and/or peer software application. Further, these APIs may be able to communicate through various distributed programming protocols as distributed computing components.

Some example embodiments may include remote procedure calls being used to implement one or more of the above illustrated components across a distributed programming environment as distributed computing components. For example, an interface component (e.g., an interface tier) may reside on a first computer system that is remotely located from a second computer system containing a logic component (e.g., a logic tier). These first and second computer systems may be configured in a server-client, peer-to-peer, or some other suitable configuration. These various components may be written using the above illustrated object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language by using a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transport Control Protocol/Internet Protocol (TCP/IP) protocol stack model for defining the protocols used by a network to transmit data.

Some embodiments may utilize the OSI model or TCP/IP protocol stack model for defining the protocols used by a network to transmit data. In applying these models, a system of data transmission between a server and client, or between peer computer systems, is illustrated as a series of roughly five layers comprising: an application layer, a transport layer, a network layer, a data link layer, and a physical layer. In the case of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), WAN, or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology) or structures.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Thus, systems and methods to build and utilize a search infrastructure are disclosed. While the present disclosure has been described in terms of several example embodiments, those of ordinary skill in the art will recognize that the present disclosure is not limited to the embodiments described, but may be practiced with modification and alteration within the spirit and scope of the appended claims. The description herein is thus to be regarded as illustrative instead of limiting.

NOTE ON THE ABSTRACT

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

We claim:
1. A computer-implemented method comprising:
generating, by a first indexing subsystem, full indexes of data;
sending the full indexes to a plurality of query node servers via a distribution system for configuring the plurality of query node servers to perform search queries using the full indexes;
generating mini-indexes associated with the full indexes;
selecting, based on an update priority of the mini-indexes, to send the mini-indexes to the plurality of query node servers via a first path, a second path different from the first path, or both, wherein the first path includes the distribution system and the second path excludes the distribution system, wherein the update priority of the mini-indexes has a first priority level or a second priority level, wherein the first priority level exceeds the second priority level, and wherein the selecting comprises:
selecting to send the mini-indexes to the plurality of query node servers via at least the second path based at least in part on the update priority of the mini-indexes having the first priority level; or
selecting to send the mini-indexes to the plurality of query node servers via the first path based at least in part on the update priority of the mini-indexes having the second priority level; and
sending, based on the selecting, the mini-indexes to the plurality of query node servers via the first path, the second path, or both, for configuring the plurality of query node servers to update indexing information using the full indexes and the mini-indexes.

2. The method of claim 1, wherein the first indexing subsystem represents a map-reduced indexing system and the mini-indexes associated with the full indexes are generated by a second indexing subsystem that is different than the first indexing subsystem.

3. The method of claim 2, wherein the second indexing subsystem representing a daemon-based indexing system that monitors for and receives in near real-time event notifications, the event notifications based on a priority ordering of events by application servers.

4. The method of claim 3, further comprising:
publishing the updated indexing information to one or more publishing channels in the distribution system based on a normal priority document update, and publishing the updated indexing information to the plurality of query node servers based on a higher priority document update.

5. The method of claim 4, further comprising:
updating the indexing information associated with normal priority document updates associated with the full indexes and high priority document updates associated with the mini-indexes at the plurality of query node servers;
receiving, over a network, a search query from a client machine;
identifying search results based on the search query and the updated indexing information; and
communicating the search results, over the network, to the client machine.

6. The method of claim 5, further comprising:
processing the event notifications of the document updates in a message queue by indexing daemons and a daemon coordinator.

7. An indexing system comprising:
a plurality of query node servers, each of the plurality of query node servers being configured to perform search queries;
a first indexing subsystem;
a second indexing subsystem;
one or more computer processors; and
one or more computer-readable mediums storing instructions that, when executed by the one or more computer processors, cause the indexing system to perform operations comprising:
generating, by the first indexing subsystem, full indexes of data;
sending the full indexes to the plurality of query node servers via a distribution system;
generating mini-indexes associated with the full indexes;
selecting, based on an update priority of the mini-indexes, to send the mini-indexes to the plurality of query node servers via a first path, a second path different from the first path, or both, wherein the first path includes the distribution system and the second path excludes the distribution system, wherein the update priority of the mini-indexes has a first priority level or a second priority level, wherein the first priority level exceeds the second priority level, and wherein the selecting comprises:
selecting to send the mini-indexes to the plurality of query node servers via at least the second path based at least in part on the update priority of the mini-indexes having the first priority level; or
selecting to send the mini-indexes to the plurality of query node servers via the first path based at least in part on the update priority of the mini-indexes having the second priority level; and
sending, based on the selecting, the mini-indexes to the plurality of query node servers via the first path, the second path, or both, for configuring the plurality of query node servers to update indexing information based on the full indexes and the mini-indexes.

8. The indexing system of claim 7, wherein the first indexing subsystem represents a map-reduced indexing system and the mini-indexes associated with the full indexes are generated by the second indexing subsystem that is different than the first indexing subsystem.

9. The indexing system of claim 8, wherein the second indexing subsystem represents a daemon-based indexing system that monitors for and receives in near real-time event notifications, the event notifications based on a priority ordering of events by application servers.

10. The indexing system of claim 9, the operations further comprising:
publishing the updated indexing information to one or more publishing channels in the distribution system based on a normal priority document update, and publishing the updated indexing information to the plurality of query node servers based on a higher priority document update.

11. The indexing system of claim 10, the operations further comprising:
updating the indexing information associated with normal priority document updates associated with the full indexes and high priority document updates associated with the mini-indexes at the plurality of query node servers;
receiving, over a network, a search query from a client machine;
identifying search results based on the search query and the updated indexing information; and
communicating the search results, over the network, to the client machine.

12. The indexing system of claim 11, the operations further comprising:
processing the event notifications of the document updates in a message queue by indexing daemons and a daemon coordinator.

13. A non-transitory computer-readable medium storing instructions that, when executed by one or more computer processors of an indexing system, cause the indexing system to perform operations comprising:
generating, by a first indexing subsystem of the indexing system, full indexes of data;
sending the full indexes to a plurality of query node servers via a distribution system for configuring the plurality of query node servers to perform search queries using the full indexes;
generating mini-indexes associated with the full indexes;
selecting, based on an update priority of the mini-indexes, to send the mini-indexes to the plurality of query node servers via a first path, a second path different from the first path, or both, wherein the first path includes the distribution system and the second path excludes the distribution system, wherein the update priority of the mini-indexes has a first priority level or a second priority level, wherein the first priority level exceeds the second priority level, and wherein the selecting comprises:
selecting to send the mini-indexes to the plurality of query node servers via at least the second path based at least in part on the update priority of the mini-indexes having the first priority level; or selecting to send the mini-indexes to the plurality of query node servers via the first path based at least in part on the update priority of the mini-indexes having the second priority level; and sending, based on the selecting, the mini-indexes to the plurality of query node servers via the first path, the second path, or both, for configuring the plurality of query node servers to update indexing information using the full indexes and the mini-indexes.

14. The non-transitory computer-readable medium of claim 13, wherein the first indexing subsystem represents a map-reduced indexing system and the mini-indexes associated with the full indexes are generated by a second indexing subsystem of the indexing system that is different than the first indexing subsystem.

15. The non-transitory computer-readable medium of claim 14, the second indexing subsystem representing a daemon-based indexing system that monitors for and receives in near real-time event notifications, the event notifications being based on a priority ordering of events by application servers.

16. The non-transitory computer-readable medium of claim 15, the operations further comprising:

publishing the updated indexing information to one or more publishing channels in the distribution system based on a normal priority document update, and publishing the updated indexing information to the plurality of query node servers based on a higher priority document update.

17. The non-transitory computer-readable medium of claim 16, the operations further comprising:

updating the indexing information associated with normal priority document updates associated with the full indexes and high priority document updates associated with the mini-indexes at the plurality of query node servers;

receiving, over a network, a search query from a client machine;

identifying search results based on the search query and the updated indexing information; and communicating the search results, over the network, to the client machine.

18. The non-transitory computer-readable medium of claim 17, the operations further comprising:

processing the event notifications of the document updates in a message queue by indexing daemons and a daemon coordinator.

\* \* \* \* \*